(12) United States Patent
Arita et al.

(10) Patent No.: US 6,885,705 B2
(45) Date of Patent: Apr. 26, 2005

(54) MOTOR VECTOR DETECTION APPARATUS FOR PERFORMING CHECKER-PATTERN SUBSAMPLING WITH RESPECT TO PIXEL ARRAYS

(75) Inventors: Miki Arita, Iizuka (JP); Shunichi Kurohmaru, Fukuoka (JP)

(73) Assignee: Matsushita Electric Industrial Co., Ltd. (JP)

( * ) Notice: Subject to any disclaimer, the term of this patent is extended or adjusted under 35 U.S.C. 154(b) by 699 days.

(21) Appl. No.: 09/866,928

(22) Filed: May 30, 2001

(65) Prior Publication Data

US 2002/0041631 A1 Apr. 11, 2002

(30) Foreign Application Priority Data

May 30, 2000 (JP) ..................................... 2000-160829

(51) Int. Cl.[7] .............................................. H04N 7/12
(52) U.S. Cl. ............................................... 375/240.16
(58) Field of Search ....................... 375/240.26, 240.13, 375/240.16, 240.17, 240.21, 240.24; H04N 7/12

(56) References Cited

U.S. PATENT DOCUMENTS

| | | | |
|---|---|---|---|
| 5,278,663 A | * 1/1994 | Hong | 375/240.16 |
| 5,717,462 A | * 2/1998 | Hayashi | 375/240.13 |
| 6,332,002 B1 | * 12/2001 | Lim et al. | 375/240.16 |
| 2002/0015513 A1 | 2/2002 | Ando et al. | 382/107 |

FOREIGN PATENT DOCUMENTS

JP 06086272 3/1994

* cited by examiner

*Primary Examiner*—Young Lee
(74) *Attorney, Agent, or Firm*—Parkhurst & Wendel, L.L.P.

(57) ABSTRACT

A motion vector detection apparatus for detecting a motion vector by performing block matching between a target block including a plurality of pixels in a current image, and a reference block including a plurality of pixels in a predetermined reference area in a past image, the apparatus including a first address generator for generating addresses of data in the target block and addresses of data in the reference area; a first storage unit for holding data of the reference area designated by the first address generator; a second storage unit for holding data of the target block designated by the first address generator; a second address generator for generating addresses of data to be outputted from the first storage unit and the second storage unit; and a motion vector detector for detecting a motion vector by using the data outputted from the first storage unit and the data outputted from the second storage unit. The second address generator is for performing subsampling on the addresses of the data to be outputted from the first storage unit and the second storage unit so that the addresses are sampled in a checker pattern with respect to pixel arrays corresponding to images of the reference block and the target block. Therefore, the amount of data to be processed is reduced, resulting in increased processing speed and reduced power consumption.

8 Claims, 25 Drawing Sheets solid line 1
solid line 2

Fig.13

| area decision code | transfer rule | | | | |
|---|---|---|---|---|---|
| | transfer start address | amount of change in horizontal direction | amount of change in vertical direction | length of rectangle in horizontal direction | length of rectangle in vertical direction |
| 0000 | 0 | 1 | 1 | 48 | 48 |
| 0001 | 0 | 1 | 1 | 32 | 48 |
| 0010 | 16 | 1 | 1 | 32 | 48 |
| 0100 | 0 | 1 | 1 | 48 | 32 |
| 0101 | 0 | 1 | 1 | 32 | 32 |
| 0110 | 16 | 1 | 1 | 32 | 32 |
| 1000 | 768 | 1 | 1 | 48 | 32 |
| 1001 | 768 | 1 | 1 | 32 | 32 |
| 1010 | 784 | 1 | 1 | 32 | 32 |

Fig.14

| 0 ........ 15 | 16 ........ 31 | 32 ........ 47 |
|---|---|---|
| 720 ........ 735 | 736 ........ 751 | 752 ........ 767 |
| 768 ........ 783 | 784 ........ 799 | 800 ........ 815 |
| 1488 ........ 1503 | 1504 ........ 1519 | 1520 ........ 1535 |
| 1536 ........ 1551 | 1552 ........ 1567 | 1568 ........ 1583 |
| 2256 ........ 2271 | 2272 ........ 2287 | 2288 ........ 2303 |

| area decision code | search propriety condition |
|---|---|
| 0000 | $-16 \leq x \leq 15,\quad -16 \leq y \leq 15$ |
| 0001 | $-16 \leq x \leq 0,\quad -16 \leq y \leq 15$ |
| 0010 | $0 \leq x \leq 15,\quad -16 \leq y \leq 15$ |
| 0100 | $-16 \leq x \leq 15,\quad -16 \leq y \leq 0$ |
| 0101 | $-16 \leq x \leq 0,\quad -16 \leq y \leq 0$ |
| 0110 | $0 \leq x \leq 15,\quad -16 \leq y \leq 0$ |
| 1000 | $-16 \leq x \leq 15,\quad 0 \leq y \leq 15$ |
| 1001 | $-16 \leq x \leq 0,\quad 0 \leq y \leq 15$ |
| 1010 | $0 \leq x \leq 15,\quad 0 \leq y \leq 15$ | sum of absolute differences $= \Sigma \ | \ \text{Ref}(Mx+x, \ My+y) - \text{Src}(x,y) \ |$

MOTOR VECTOR DETECTION APPARATUS FOR PERFORMING CHECKER-PATTERN SUBSAMPLING WITH RESPECT TO PIXEL ARRAYS

FIELD OF THE INVENTION

The present invention relates to image compression and, more particularly, to motion vector detection applicable to H.261, H263, MPEG4, and the like, which are the standards for low bit rate, aimed at image communication.

BACKGROUND OF THE INVENTION

In the existing standards for low bit rate aimed at image communication, such as H.261, H263, MPEG4, etc., motion vector detection is carried out for data compression using correlation between frames.

This motion vector detection is usually performed on a block (target block) comprising plural pixels in a current image (frame), and block matching is performed to check where the target block is positioned in a past image (frame) that is previous to the current image, thereby detecting a motion vector indicating the direction and amount of the motion of image.

FIG. 31 is a diagram for explaining the conventional motion vector detection. With reference to FIG. 31, a target block T is a block to be coded, comprising NX×NY pixels and included in a current image. A reference area is a search area comprising MX×MY pixels and included in a previous image, and this reference area is spatially in the vicinity of the target block T and is larger than the target block T. Further, a reference block I is a block comprising NX×NY pixels, placed in an arbitrary position in the reference area.

In general motion vector detection using block matching, the target block T is compared with plural reference blocks I in the reference area to obtain the position of a reference block I that is most matched with the target block T. Thereafter, the distance and direction between the position of the target block T and the position of the most-matching reference block I in the reference area, are detected as a motion vector. Matching between the target block T and the reference block I is carried out on the basis of the sum of absolute values of differences in pixel values between the target block T and the reference block I, as represented by the following formula (1).

$$\Sigma |Ref(Mx+x, My+y) - Src(x,y)| \quad (1)$$

wherein Ref (Mx+x,My+y) indicates the positions of pixels in the reference block, and Src(x,y) indicates the positions of pixels in the target block.

In order to detect a more accurate motion vector, the values of pixels positioned between pixel data in the reference area are obtained by interpolation, and matching with the target block is curried out with respect to the positions so obtained.

The calculation represented by formula (1) is the sum of absolute values of differences in pixel values between the NX×NY pixels constituting the target block and the NX×NY pixels constituting the reference block and, therefore, it requires enormous amounts of calculation to perform the same calculation on all of reference blocks in the reference area.

Usually, when the value of the sum of absolute differences in a search position is relatively large, this value may exceed the minimum value of the sum in the middle of the calculation Thereby, needless calculation is executed even though the position of this search area can be excluded from the candidates of search areas for motion vector detection, resulting in losses in calculation speed and power consumption.

Further, a motion vector hardly changes in the vicinity of a target block on which the motion vector is detected. However, even when an image of high resolution is not required especially, motion vector detection is carried out on the peripheral blocks, resulting in losses in calculation speed and power consumption.

In order to reduce the losses, whether there is a change or not may be checked using a versatile processor before performing calculation using a dedicated processor to decide whether search should be executed or not. In this case, however, a heavy load is put on the versatile processor.

In order to reduce the load on the versatile processor, the dedicated processor may have a function of calculating the sum of absolute difference only one time. In this case, however, if there is no change and therefore no search is required, operating the processor to obtain this result causes losses in calculation speed and power consumption.

Furthermore, when search for a reference block with respect to a target block is performed on reference blocks in the vicinity of the target block so as to minimize the sum of absolute differences in pixel values, there is a possibility that a once searched reference block may be searched again (double search), resulting in losses in calculation speed and power consumption.

Further, the sum of absolute differences is obtained by summing the absolute values of differences in pixel values between all pixels in a target block and all pixels in a reference block, even when an image of high resolution is not needed, calculation more than necessary is carried out, resulting in losses in calculation speed and power consumption.

In order to reduce the losses, subsampling may be performed, on every other line, on the pixels constituting the blocks, thereby reducing the amount of calculation. In this case, however, since pixel data to be used for motion vector detection become part of read-in pixel data, pixel data other than those to be used for motion vector detection, which have already been read, are undesirably discarded, resulting in a loss in power consumption.

Furthermore, when the target block is positioned at an edge of an effective region of pixel data, an area on which motion vector detection cannot be carried out is included in the reference area. Even when data are transferred to this area, the data are not used for detection, resulting in a loss in power consumption.

Furthermore, since there is an overlap between reference areas corresponding to adjacent target blocks, reading pixel data in the entire reference area into the dedicated processor at every search on each target block causes losses in computation speed and power consumption.

When the target block is positioned at an edge of the effective region of image data, some of image data in a reference area to be used for calculation are out of the effective region, depending on the position of the motion vector. In this case, motion vector detection cannot be carried out.

Furthermore, when performing interpolation to obtain the values of pixels positioned between pixels constituting a reference block, the pixel data constituting the reference block are read out in one direction. So, when the pixel data are read out in the horizontal direction, if the pixel values in positions between pixels in the vertical direction are desired, the processor should wait several cycles until the pixels required for interpolation in the vertical direction are prepared, resulting in a loss in the computation speed.

SUMMARY OF THE INVENTION

The present invention is made to solve the above-described problems and has for its object to provide a motion vector detection apparatus that realizes high-speed and low-power motion vector detection.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a motion vector detection apparatus for detecting a motion vector by performing block matching between a target block comprising a plurality of pixels in a current image, and a reference block comprising a plurality of pixels in a predetermined reference area in a past image that is previous to the current image, and this apparatus comprises: a first address generator for generating addresses of data in the target block and addresses of data in the reference area; a first storage unit for holding data of the reference area designated by the first address generator; a second storage unit for holding data of the target block designated by the first address generator; a second address generator for generating addresses of data to be outputted from the first storage unit and the second storage unit; and a motion vector detector for detecting a motion vector by using the data to be outputted from the first storage unit and the data outputted from the second storage unit; wherein the second address generator performs subsampling on the addresses of the data to be outputted from the first storage unit and the second storage unit so that the addresses are sampled in a checker pattern with respect to pixel arrays corresponding to images of the reference block and the target block. Therefore, as compared with the case where the sum of absolute differences is obtained from all pixels constituting a macroblock, similar precision is obtained if the compression ratio is relatively high. Further, the amount of calculation required to obtain the sum of absolute differences is reduced by half, leading to increased processing speed and reduced power consumption.

According to a second aspect of the present invention, in the motion vector detection apparatus according to the first aspect, the second address generator comprises: a row counter for counting pixel addresses in the horizontal direction, a column counter for counting pixel addresses in the vertical direction, and an address holder for holding addresses of pixel data; and an inverted value of LSB (least significant bit) of the count value outputted from the column counter is added to each address of pixel data, thereby performing the checker-pattern subsampling with respect to the pixel arrays corresponding to the images of the reference block and the target block. Therefore, as compared with the case where the sum of absolute differences is obtained from all pixels constituting a macroblock, similar precision is obtained if the compression ratio is relatively high. Further, the amount of calculation required to obtain the sum of absolute differences is reduced by half, leading to increased processing speed and reduced power consumption.

According to a third aspect of the present invention, there is provided a motion vector detection apparatus for detecting a motion vector by performing block matching between a target block comprising a plurality of pixels in a current image, and a reference block comprising a plurality of pixels in a predetermined reference area in a past image that is previous to the current image, and this apparatus comprises: a first address generator for generating addresses of data in the target block and addresses of data in the reference area; a first storage unit for holding data of the reference area designated by the first address generator; a second storage unit for holding data of the target block designated by the first address generator; a second address generator for generating addresses of data to be outputted from the first storage unit and the second storage unit; and a motion vector detector for detecting a motion vector by using the data outputted from the first storage unit and the data outputted from the second storage unit; wherein the motion vector detector subtracts the absolute values of differences in pixel data between the reference block and the target block, one by one, from a threshold value, and when the result of subtraction becomes negative, the motion vector detector stops calculation of the sum of absolute differences in the corresponding position. Therefore, the processing speed is increased, and the power consumption is reduced.

According to a fourth aspect of the present invention, there is provided a motion vector detection apparatus for detecting a motion vector by performing block matching between a target block comprising a plurality of pixels in a current image, and a reference block comprising a plurality of pixels in a predetermined reference area in a past image that is previous to the current image, and this apparatus comprises: a first address generator for generating addresses of data in the target block and addresses of data in the reference area; a first storage unit for holding data of the reference area designated by the first address generator; a second storage unit for holding data of the target block designated by the first address generator; a second address generator for generating addresses of data to be outputted from the first storage unit and the second storage unit; a motion vector detector for detecting a motion vector by using the data outputted from the first storage unit and the data outputted from the second storage unit; and a search history holder for holding history of search for reference blocks in the reference area which has already been searched; wherein execution of search is skipped with respect to every reference block whose search history has been stored in the search history holder. Therefore, double search on the same reference block is avoided, leading to increased processing speed and reduced power consumption.

According to a fifth aspect of the present invention, in the motion vector detection apparatus according to the fourth aspect, the search history holder holds, as search history, the position of a target of search, and information as to whether reference blocks in eight positions on the periphery of the target have been searched or not. Therefore, double search on the same reference block is avoided, leading to increased processing speed and reduced power consumption.

According to a sixth aspect of the present invention, there is provided a motion vector detection apparatus for detecting a motion vector by performing block matching between a target block comprising a plurality of pixels in a current image, and a reference block comprising a plurality of pixels in a predetermined reference area in a past image that is previous to the current image, and this apparatus comprises: a first address generator for generating addresses of data in the target block and addresses of data in the reference area; a first storage unit for holding data of the reference area designated by the first address generator; a second storage unit for holding data of the target block designated by the first address generator; a second address generator for generating addresses of data to be outputted from the first storage unit and the second storage unit; a motion vector detector for detecting a motion vector by using the data outputted from the first storage unit and the data outputted from the second storage unit; a transfer rule holder for holding transfer rules by which the first address generator generates addresses of reference area data to be outputted to the first storage unit; and a transfer rule detector for detecting a transfer rule from the transfer rule holder on the basis of an area decision code indicating an effective area of image data, and outputting the transfer rule to the first address generator; wherein the first address generator generates addresses of reference area data to be outputted to the first storage unit, on the basis of the transfer rule outputted from the transfer rule detector. Therefore, the amount of data to be transferred to the first storage unit is minimized, leading to increased processing speed and reduced power consumption.

According to a seventh aspect of the present invention, there is provided a motion vector detection apparatus for detecting a motion vector by performing block matching between a target block comprising a plurality of pixels in a current image, and a reference block comprising a plurality of pixels in a predetermined reference area in a past image that is previous to the current image, and this apparatus comprises: a first address generator for generating addresses of data in the target block and addresses of data in the reference area; a first storage unit having a double buffer structure to perform data read-in and data read-out simultaneously, and holding data of the reference area designated by the first address generator; a second storage unit for holding data of the target block designated by the first address generator; a second address generator for generating addresses of data to be outputted from the first storage unit and the second storage unit; a motion vector detector for detecting a motion vector by using the data outputted from the first storage unit and the data outputted from the second storage unit; and a stored data controller for controlling read-in and read-out of the reference area data into/from the first storage unit; wherein the first storage unit possesses two buffer memories, and the stored data controller copies effective data from one of the buffer memories in which data read-out has completed, into the other buffer memory in which data read-in is carried out, thereby reducing the amount of data to be written in the first storage unit. Therefore, the amount of data to be newly read into the first storage unit is reduced, leading to increased processing speed and reduced power consumption.

According to an eighth aspect of the present invention, in the motion vector detection apparatus according to any of the first to seventh aspects, the motion vector detector is an integer precision motion vector detector that detects an integer precision motion vector from the data outputted from the first storage unit and the data outputted from the second storage unit. Therefore, the same effects as mentioned above are achieved.

According to a ninth aspect of the present invention, in the motion vector detection apparatus according to any of the first to seventh aspects, the motion vector detector comprises: an interpolation pixel generator for receiving the data outputted from the first storage unit, and generating decimal precision pixel data; and a decimal precision motion vector detector for detecting a decimal precision motion vector from the data outputted from the interpolation pixel generator and the data outputted from the second storage unit. Therefore, the same effects as mentioned above are achieved.

According to a tenth aspect of the present invention, in the motion vector detection apparatus according to any of the first to seventh aspects, the motion vector detector comprises: an integer precision motion vector detector that detects an integer precision motion vector from the data outputted from the first storage unit and the data outputted from the second storage unit; an interpolation pixel generator for receiving the data outputted from the first storage unit, and generating decimal precision pixel data; and a decimal precision motion vector detector for detecting a decimal precision motion vector from the data outputted from the interpolation pixel generator and the data outputted from the second storage unit. Therefore, the same effects as mentioned above are achieved.

According to an eleventh aspect of the present invention, there is provided a motion vector detection apparatus for detecting a motion vector by performing block matching between a target block comprising a plurality of pixels in a current image, and a reference block comprising a plurality of pixels in a predetermined reference area in a past image that is previous to the current image, and this apparatus comprises: a first address generator for generating addresses of data in the target block and addresses of data in the reference area; a first storage unit for holding data of the reference area designated by the first address generator; a second storage unit for holding data of the target block designated by the first address generator; a second address generator for generating addresses of data to be outputted from the first storage unit and the second storage unit; an interpolation pixel generator for receiving the data outputted from the first storage unit, and generating decimal precision pixel data; a decimal precision motion vector detector for detecting a decimal precision motion vector from the data outputted from the interpolation pixel generator and the data outputted from the second storage unit; and a reading direction decision unit for deciding the reading direction of the reference area data stored in the first storage unit, and outputting the reading direction to the second address generator; wherein the second address generator generates addresses of pixel data to be outputted from the first storage unit, on the basis of the reading direction decided by the reading direction decision unit. Therefore, it is possible to generate decimal precision pixel data that are a predetermined length shifted in the vertical direction or the horizontal direction, at high speed and at the same timing, without altering the structure of the interpolation pixel generator, resulting in increased processing speed and reduced power consumption.

According to a twelfth aspect of the present invention, in the motion vector detection apparatus according to the eleventh aspect, the reading direction decision unit decides that data should be read in the horizontal direction or the vertical direction with respect to the image data stored in the first storage unit. Therefore, it is possible to generate decimal precision pixel data that are a predetermined length shifted in the vertical direction or the horizontal direction, at high speed and at the same timing, without altering the structure of the interpolation pixel generator, resulting in increased processing speed and reduced power consumption.

According to a thirteenth aspect of the present invention, in the motion vector detection apparatus according to the eleventh or twelfth aspect, the interpolation pixel generator comprises: a shift register unit comprising at least two shift registers; and an interpolation unit performing interpolation using pixel data stored in the shift register unit. Therefore, it is possible to generate decimal precision pixel data at high speed and at the same timing, leading to reduced amount of data to transfer, increased processing speed, and reduced power consumption.

According to a fourteenth aspect of the present invention, in the motion vector detection apparatus according to the eleventh or twelfth aspect, the interpolation pixel generator comprises: a shift register unit comprising, at least, (the number of pixels to be read out in a specific direction+2) pieces of shift registers; and an interpolation unit performing interpolation using pixel data stored in the shift register unit. Therefore, it is possible to generate decimal precision pixel data at high speed and at the same timing, leading to reduced amount of data to transfer, increased processing speed, and reduced power consumption.

According to a fifteenth aspect of the present invention, there is provided a motion vector detection apparatus for detecting a motion vector by performing block matching between a target block comprising a plurality of pixels in a current image, and a reference block comprising a plurality of pixels in a predetermined reference area in a past image that is previous to the current image, and this apparatus comprises: a first address generator for generating addresses of data in the target block and addresses of data in the reference area; a first storage unit for holding data of the reference area designated by the first address generator; a second storage unit for holding data of the target block designated by the first address generator; a second address generator for generating addresses of data to be outputted from the first storage unit and the second storage unit; an interpolation pixel generator for receiving the data outputted from the first storage unit, and generating decimal precision pixel data; a decimal precision motion vector detector for detecting a decimal precision motion vector from the data outputted from the interpolation pixel generator and the data outputted from the second storage unit; wherein the decimal precision motion vector detector performs parallel detection of decimal precision motion vectors on two decimal precision reference blocks which ate composed of plural pixel data outputted from the interpolation pixel generator and are positioned, with respect to a reference block in the center, above and beneath, on the left and on the right, diagonally to the upper right and diagonally to the lower right, diagonally to upper left and diagonally to the lower left, diagonally to the upper right and diagonally to the upper left, or diagonally to the lower right and diagonally to the lower left. Therefore, the amount of data to be processed by the interpolation pixel generator is reduced, and the amount of data to be read from the first storage unit is reduced. Thereby, the processing speed of the motion vector detection apparatus is increased, and the power consumption is reduced.

According to a sixteenth aspect of the present invention, the motion vector detection apparatus according to any of the eleventh to fifteenth aspects further comprises an integer precision motion vector detector for detecting an integer precision motion vector from the data outputted from the first storage unit and the data outputted from the second storage unit. Therefore, the motion vector detection apparatus can perform search for an integer precision motion vector.

According to a seventeenth aspect of the present invention, there is provided a motion vector detection apparatus for detecting a motion vector by performing block matching between a target block comprising a plurality of pixels in a current image, and a reference block comprising a plurality of pixels in a predetermined reference area in a past image that is previous to the current image, and this apparatus comprises: a first address generator for generating addresses of data in the target block and addresses of data in the reference area; a first storage unit for holding data of the reference area designated by the first address generator; a second storage unit for holding data of the target block designated by the first address generator; a second address generator for generating addresses of data to be outputted from the first storage unit and the second storage unit; an integer precision motion vector detector for detecting an integer precision motion vector from the data outputted from the first storage unit and the data outputted from the second storage unit; a search propriety condition holder for holding search propriety conditions for judging whether search can be carried out in the corresponding positions or not; and a search propriety condition detector for detecting a search propriety condition from the search propriety condition holder, on the basis of an area decision code indicating an effective area in the reference area, and outputting the condition to the second address generator; wherein the second address generator generates addresses of data to be outputted from the first storage unit, using the search propriety condition detected by the search propriety condition detector. Therefore, the second address generator can generate pixel addresses in an area where effective search is possible, leading to high-speed processing without needless search.

According to an eighteenth aspect of the present invention, the motion vector detection apparatus according to the seventeenth aspect further comprises: an interpolation pixel generator for receiving the data outputted from the first storage means, and generating decimal precision pixel data; and a decimal precision motion vector detector for detecting a decimal precision motion vector from the data outputted from the interpolation pixel generator and the data outputted from the second storage means; wherein the second address generator uses the search propriety condition holder and the search propriety condition detector when detecting the integer precision motion vector, and when detecting the decimal precision motion vector. Therefore, the circuit scale is minimized, leading to reduced production cost.

According to a nineteenth aspect of the present invention, the motion vector detection apparatus according to the seventeenth aspect further comprises: an interpolation pixel generator for receiving the data outputted from the first storage means, and generating decimal precision pixel data; and a decimal precision motion vector detector for detecting a decimal precision motion vector from the data outputted from the interpolation pixel generator and the data outputted from the second storage means; wherein the second address generator judges the propriety of search by using the search propriety condition holder and the search propriety condition detector when detecting the integer precision motion vector, and judges, by using the result of the judgement, the propriety of search when detecting the decimal precision motion vector. Therefore, whether search should be performed or not can be judged without detecting the search propriety condition when detecting a decimal precision motion vector, leading to increased processing speed. Further, since the result of search for detecting the integer precision motion vector is used for detecting the decimal precision motion vector, the circuit scale is reduced, leading to reduced production cost.

According to a twentieth aspect of the present invention, there is provided a motion vector detection apparatus for detecting a motion vector by performing block matching between a target block comprising a plurality of pixels in a current image, and a reference block comprising a plurality of pixels in a predetermined reference area in a past image that is previous to the current image, and this apparatus comprises: a first address generator for generating addresses of data in the target block and addresses of data in the reference area; a first storage unit for holding data of the reference area designated by the first address generator; a second storage unit for holding data of the target block designated by the first address generator; a second address generator for generating addresses of data to be outputted from the first storage unit and the second storage unit; an integer precision motion vector detector for detecting an integer precision motion vector from the data outputted from the first storage unit and the data outputted from the second storage unit; and a search execution propriety decision unit for holding a motion vector that has been detected by the previous search, and compares the absolute difference values calculated by the integer precision motion vector detector with a predetermined threshold value to decide whether motion vector search should be executed or not; wherein the second address generator generates addresses of data to be outputted from the first storage unit and the second storage unit, by using the motion vector that has been detected by the previous search and stored in the search execution propriety decision unit. Therefore, the processing speed is increased, and the power consumption is reduced.

According to a twenty-first aspect of the present invention, in the motion vector detection apparatus according to the twentieth aspect, the second address generator outputs the data outputted from the first storage means, as the result of calculation of this apparatus. Therefore, pixel data indicated by the motion vector detected in the previous search can be outputted to an external device.

According to a twenty-second aspect of the present invention, the motion vector detection apparatus according to the twentieth or twenty-first aspect further comprises: an interpolation pixel generator for receiving the data outputted from the first storage unit, and generating decimal precision pixel data; and a decimal precision motion vector detector for detecting a decimal precision motion vector from the data outputted from the interpolation pixel generator and the data outputted from the second storage unit. Therefore, a decimal precision motion vector can be detected, in addition to the above-mentioned effects.

BRIEF DESCRIPTION OF THE DRAWINGS

FIG. 13 is a diagram illustrating an example of area decision codes and transfer rules, which are stored in a transfer rule holder according to the fourth embodiment of the invention.

FIG. 14 is a diagram illustrating an example of pixel addresses of reference area data.

DETAILED DESCRIPTION OF THE PREFERRED EMBODIMENTS

[Embodiment 1]

Hereinafter, a motion vector detection apparatus according to a first embodiment of the present invention will be described with reference to FIGS. 1 to 4.

Figure 1:
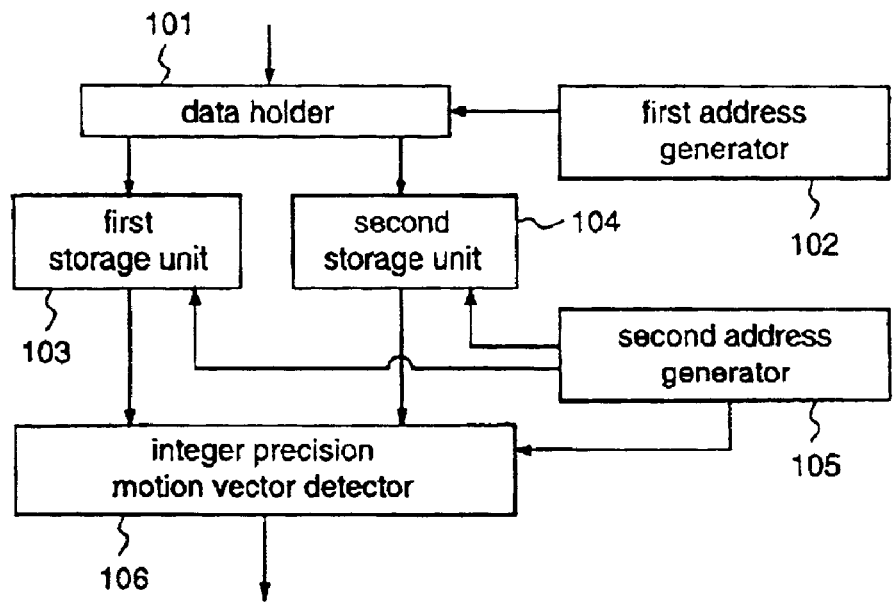
FIG. 1 is a block diagram illustrating a motion vector detection apparatus according to a first embodiment of the present invention.

FIG. 1 is a block diagram illustrating the structure of a motion vector detection apparatus according to the first embodiment. In FIG. 1, the motion vector detection apparatus comprises a data holder 101, a first address generator 102, a first storage unit 103, a second storage unit 104, a second address generator 105, and an integer precision motion vector detector 106.

The data holder 101 is a bulk memory for holding image data. The data holder 101 outputs data of a reference area to the first storage unit 103, and outputs data of a target block to the second storage unit 104, according to an instruction from the first address generator 102.

The first address generator 102 generates, from the image data stored in the data holder 101, addresses of the data of the target block (data to be subjected to coding), and addresses of the data of the reference area where search for a reference block to be used for block matching with the target block is carried out.

In the motion vector detection apparatus of the present invention described hereinafter, a target block or a reference block is a unit of image comprising plural pixels, and one block comprises 256 pixels (=vertical 16 pixels×horizontal 16 pixels).

The first storage unit 103 holds the data of the reference area indicated by the first address generator 102, and outputs the pixel data of a reference block to be used for block matching with the target block, according to an instruction from the second address generator 105.

In the motion vector detection apparatus of the present invention described hereinafter, the range of a motion vector to be detected is −16~+15.5. As a search area corresponding to this range, the reference area held by the first storage unit 103 comprises 48 pixels×horizontal 48 pixels with the target block position in the center.

The second storage unit 104 holds the data of the target block indicated by the first address generator 102, and outputs the pixel data of the target block according to an instruction from the second address generator 105.

The second address generator 105 generates addresses of the pixel data outputted from the first storage unit 103 and the second storage unit 104, and notifies the integer precision motion vector detector 106 that search is ended.

This search is a process of searching the reference area for a reference block having the smallest absolute differences in pixel values from those of the target block. This search is ended when comparison of the target block with a predetermined number of reference blocks is ended, or when comparison of the target block with all reference blocks within the search area range is ended, or when it is detected that the absolute differences of a reference block in a specific position with respect to the target block is smaller than those of reference blocks positioned above, beneath, and on both sides of the reference block.

The integer precision motion vector detector 106 calculates the sum of the absolute differences of each reference block with respect to the target block by using the pixel data of the reference block outputted from the first storage unit 103 and the pixel data of the target block outputted from the second storage unit 104, and searches for a reference block having the smallest sum of absolute differences thereby detecting a motion vector.

Next, the second address generator 105, which is a feature of the motion vector detection apparatus of the first embodiment, will be described in more detail.

Hereinafter, a description will be given of the process of generating addresses of pixel data by the second address generator 105, with reference to FIGS. 2 to 4. The second address generator 105 of this first embodiment performs checker-pattern subsampling on a matrix of pixels in an image.

Figure 2:
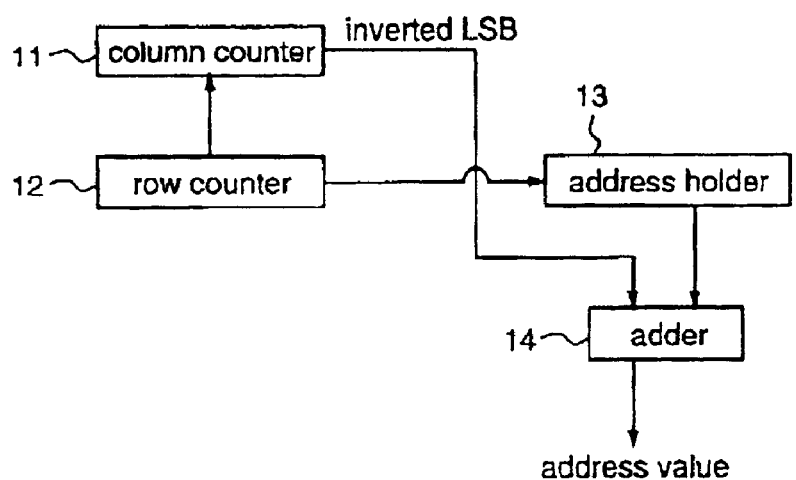
FIG. 2 is a block diagram illustrating a second address generator according to the first embodiment of the invention.
Figure 3:
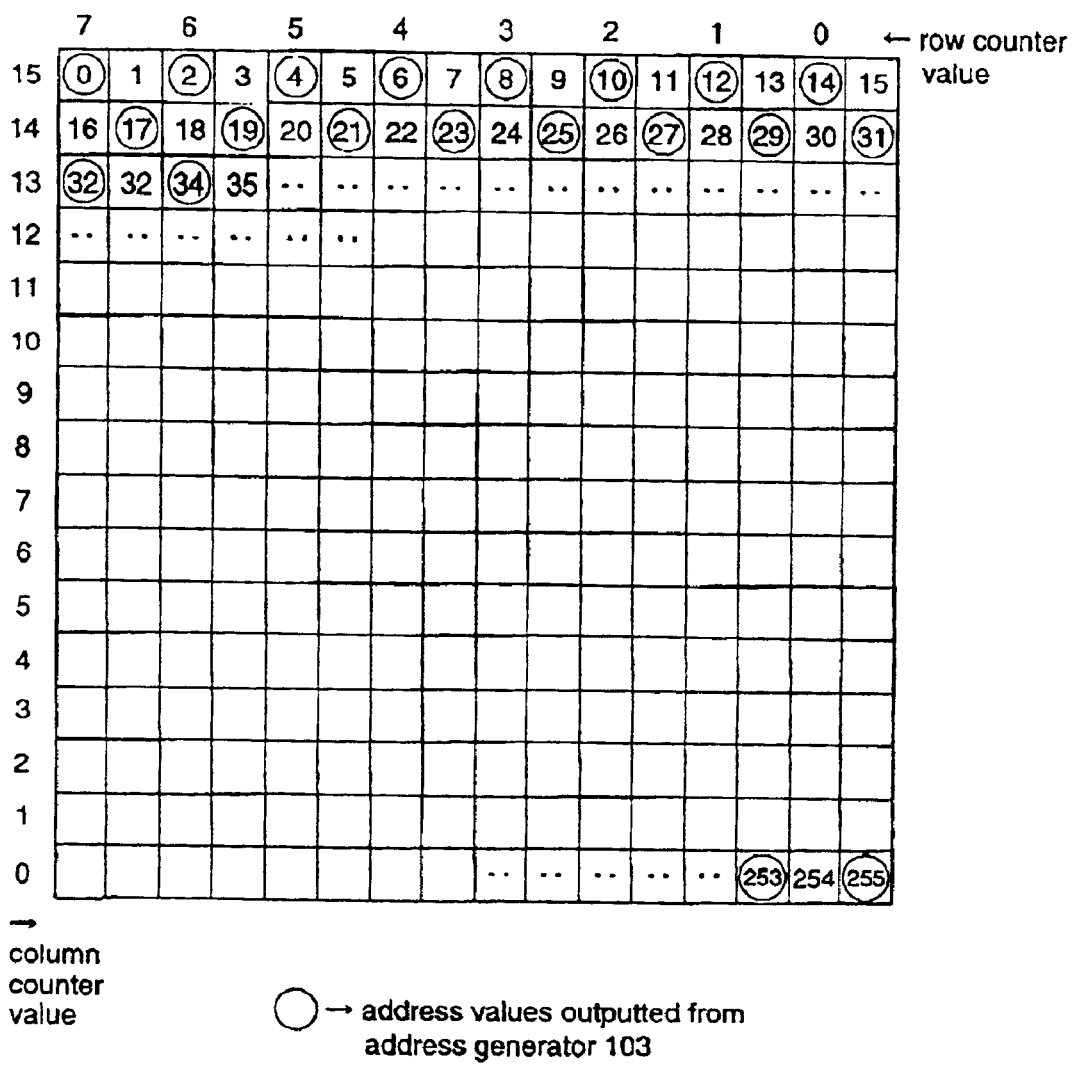
FIG. 3 is a diagram illustrating an example of a macroblock on which the second address generator of the first embodiment performs subsampling.

FIG. 2 is a block diagram illustrating the structure of the second address generator 105. FIG. 3 is a diagram illustrating an example of a macroblock on which the second address generator 105 performs checker-pattern subsampling. As shown in FIG. 3, the respective pixels in the macroblock are assigned with address values from 0 (initial value) to 255.

With reference to FIG. 2, the second address generator 105 is provided with a column counter 11, a row counter 12, an address holder 13, and an adder 14.

Both of the row counter 11 and the column counter 12 are down counters, and are given row count values and column count values, respectively. The row counter 11 is decremented every time the second address generator 105 outputs an address of pixel data. The column counter 12 is decremented when the row counter 11 becomes "0". Further, every time the row counter 11 is decremented, the column counter 12 outputs an inverted value of LSB (least significant bit) of the column counter value to the adder 14.

The address holder 13 holds an address value (hereinafter, an address value stored in advance is referred to as an initial address value). When the row counter 11 is decremented, an address value obtained by adding "2" to the initial address value held by the address holder 13 is outputted to the adder 14, and the initial address value in the address holder 13 is updated to the address value outputted to the adder 14. The initial value of the initial address value held by the address holder 13 is "0".

The adder 14 adds the inverted value of LSB of the column counter value outputted from the column counter 12, to the address value outputted from the address holder 13, and outputs the sum as a pixel data address value. That is, when the LSB of the column counter value outputted from the column counter 12 is "1", i.e., when the column counter value is an even number, the "0" is inverted to "1" and this "1" is added to the address value outputted from the address holder 13, and the sum is outputted as a pixel data address value. On the other hand, when the LSB of the column counter value outputted from the column counter 12 is "1", i.e., when the column counter value is an odd number, the "1" is inverted to "0" and this "0" is added to the address value outputted from the address holder 13, and the sum is outputted as a pixel data address value Next, the operation of the second address generator 105 will be described with reference to FIGS. 3 and 4.

Figure 4:
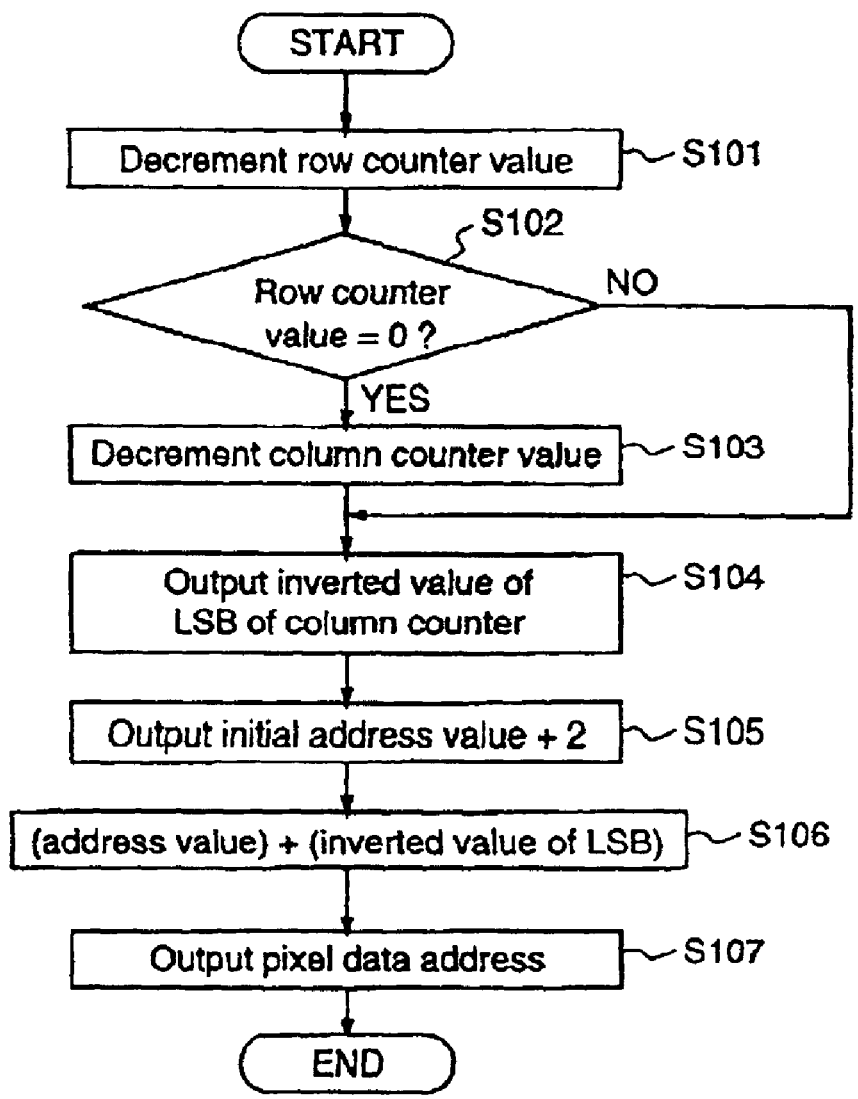
FIG. 4 is a flowchart for explaining the process of generating addresses of pixel data by the second address generator of the first embodiment.

FIG. 4 is a flowchart for explaining the process of address generation by the address generator 105.

When the row counter 11 is decremented (step S101), the column counter 12 checks whether the row counter value is "0" or not (step S102).

When the row counter value is "0", the column counter 12 is decremented (step S103), and the inverted value of the LSB of the decremented column counter value is outputted to the adder 14 (step S104).

When the row counter value is not "0", the value of the column counter 12 is not changed, and the inverted value of the LSB of the column counter value is outputted to the adder 14 (step S104).

On the other hand, when the row counter 11 is decremented (step S101), the address holder 13 outputs the value obtained by adding "2" to the initial address value, to the adder 14, and updates the initial address value to the outputted address value, i.e., the value obtained by adding "2" to the initial address value that has been held by the holder 13 (step S105).

Next, the adder 14 adds the inverted value of the LSB of the column counter value outputted from the column counter 12 in step S104, to the address value outputted from the address holder 13 (step S106), and outputs the sum as a pixel data address value (step S107).

As described above, since the second address generator 105 is provided with row counter 12, the column counter 11, the address holder 13, and the adder 14, the second address generator 105 can perform checker-pattern subsampling of pixel data positions, on the matrix of pixels in an image. Therefore, as compared with the case where the sum of absolute differences is obtained from all pixels constituting a macroblock, similar precision is obtained if the compression ratio is relatively high. Further, the amount of calculation required to obtain the sum of absolute differences is reduced by half, leading to increased processing speed and reduced power consumption.

Further, as compared with the conventional subsampling on only the horizontal components or the vertical components to reduce the amount of data to be processed, the above-mentioned checker-pattern subsampling is less affected by distribution of pixels. Further, as compared with the conventional subsampling in the horizontal direction and the vertical direction at the same ratio to reduce the amount of data to be processed, the above-mentioned checker-pattern subsampling provides the sum of absolute differences with higher precision, resulting in highly precise motion vector detection.

While in this first embodiment the second address generator 105 performs checker-pattern subsampling of pixel data positions on a matrix of pixels in an image, the present invention is not restricted thereto. The second address generator 105 can perform arbitrary subsampling on a matrix of pixels in an image by arbitrarily changing the set values on the row counter 11, the column counter 12, and the address holder 13.

[Embodiment 2]

Hereinafter, a motion vector detection apparatus according to a second embodiment of the invention will be described with reference to FIGS. 5 to 7.

Figure 5:
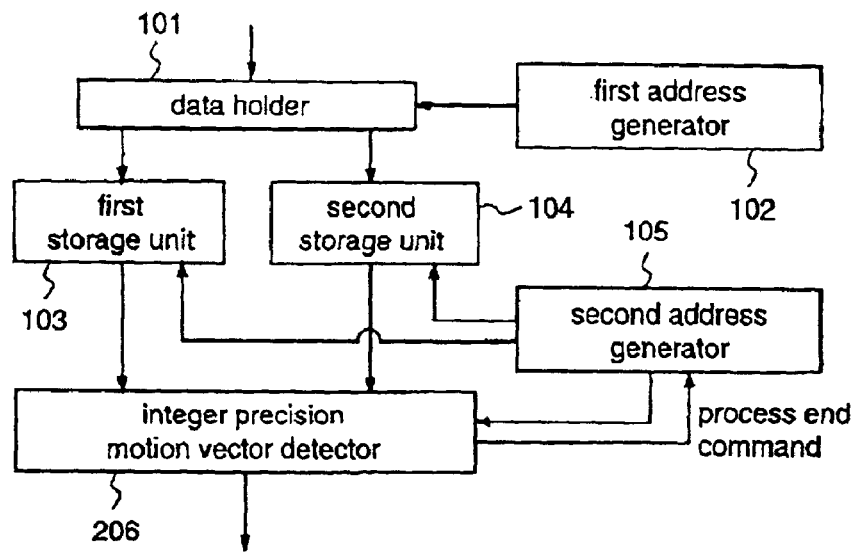
FIG. 5 is a block diagram illustrating a motion vector detection apparatus according to a second embodiment of the invention.

FIG. 5 is a block diagram illustrating the structure of a motion vector detection apparatus according to the second embodiment. With reference to FIG. 5, the motion vector detection apparatus is provided with a data holder 101, a first address generator 102, a first storage unit 103, a second storage unit 104, a second address generator 105, and an integer precision motion vector detector 206.

The motion vector detection apparatus of this second embodiment is different from the motion vector detection apparatus of the first embodiment only in that the integer precision motion vector detector 206 is featured. Therefore, the same constituents as those of the motion vector detection apparatus according to the first embodiment are given the same reference numerals, and description of these constituents will be omitted.

Hereinafter, the integer precision motion vector detector 206 according to this second embodiment will be described in more detail with reference to FIGS. 6 and 7.

Figure 6:
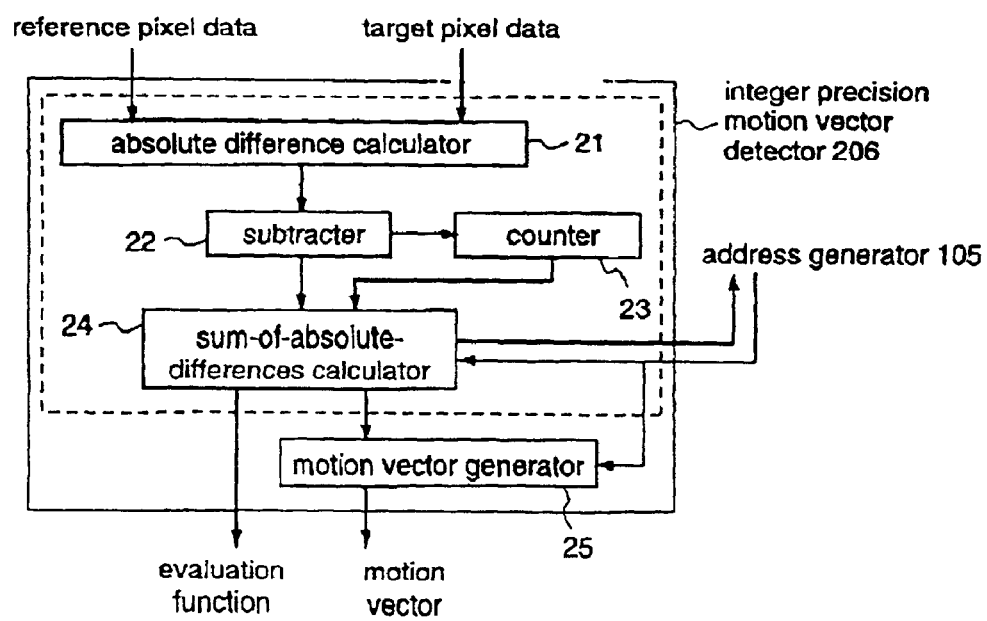
FIG. 6 is a block diagram illustrating a motion vector detector according to the second embodiment of the invention.

FIG. 6 is a block diagram illustrating the structure of the integer precision motion vector detector 206. With reference to FIG. 6, the integer precision motion vector detector 206 comprises a calculator 21 for calculating absolute differences, a subtracter 22, a counter 23, a calculator 24 for calculating the sum of absolute differences, and a motion vector generator 25.

The calculator 21 calculates the absolute values of differences in pixel values between pixel data of a target block and pixel data of a reference block corresponding to the pixel data of the target block, and outputs the absolute difference values to the subtracter 22.

Every time an absolute difference value is outputted from the calculator 21, the subtracter 22 subtracts the absolute difference value from a threshold value set in the calculator 24. Hereinafter, the threshold value before subtraction by the subtracter 22 is started is referred to as the initial threshold value.

The counter 23 is an up counter having a predetermined number of counts. The counter 23 is incremented every time the subtracter 22 subtracts the absolute difference value from the threshold value. The counter 23 of this second embodiment counts from 0 to 127 because the integer precision motion vector detector 206 calculates the sum of absolute differences, using the pixel data obtained by performing checker-pattern subsampling on a macroblock comprising 16 pixels×16 pixels.

The calculator 24 holds an initial threshold value, and the threshold value from which the absolute difference value is subtracted by the subtracter 22.

Further, the calculator 24 sets the counter 23 to "0" when the threshold value becomes negative as the result of the subtraction by the subtracter 22, and stops the processes of the calculator 21 and the subtracter 22, and outputs a signal indicating that the corresponding reference block should be excluded from the candidates for a reference block having the smallest sum of absolute differences.

On the other hand, so long as the threshold value remains positive, the subtraction by the subtracter 22 is continued until the value of the counter 23 reaches "127". When the threshold value remains positive and the value of the counter 23 becomes "127", the counter 23 is reset to "0", and this positive value is subtracted from the initial threshold value possessed by the calculator 24. Then, the initial threshold value of the calculator 24 is updated to the value obtained by this subtraction.

Further, since this reference block is a candidate for a reference block having the smallest sum of absolute differences, the data indicating the position of this reference block and the position of the target block are outputted from the second address generator 105 to the motion vector generator 25. Whether the threshold value possessed by the calculator 24 becomes negative or not is judged according to whether the MSB (most significant bit) of the threshold value is "1" (indicating negative) or not.

Further, when the calculator 24 receives a signal informing that search is ended from the second address generator 105, the calculator 24 outputs the initial threshold value at this point of time, as an evaluation function.

On receipt of the data indicating the position of the reference block and the position of the target block from the calculator 24, the motion vector generator 25 generates a motion vector from the amount of change. The motion vector generator 25 generates a motion vector every time it receives the output from the calculator 24, and updates the motion vector that has previously been generated to the most-recently generated motion vector.

Further, On receipt of a signal indicating that search is ended from the second address generator 105, the motion vector generator 25 outputs the motion vector at this point of time, as the motion vector of the target block.

Next, the operation of the integer precision motion vector detector 206 will be described with reference to FIG. 7.

Figure 7:
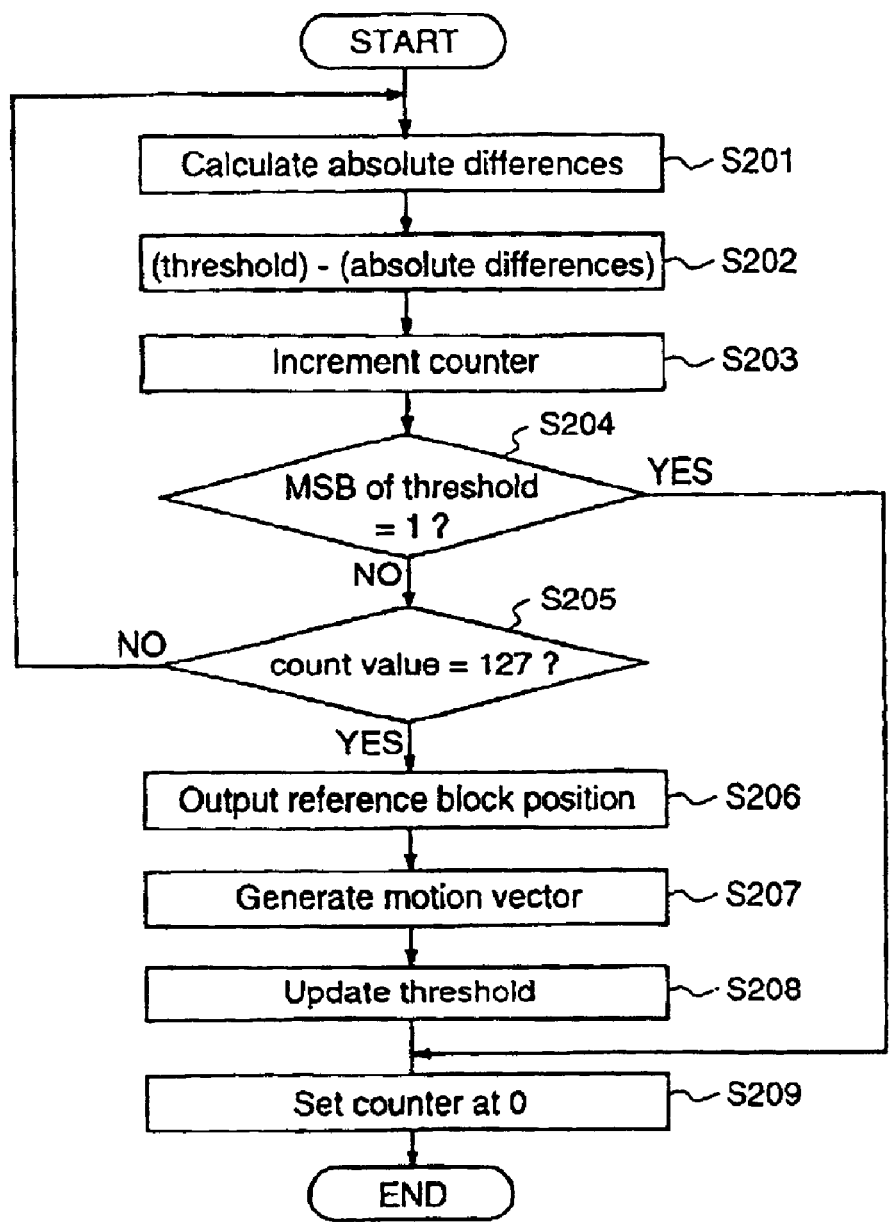
FIG. 7 is a flowchart for explaining the operation of an integer precision motion vector detector according to the second embodiment of the invention.

FIG. 7 is a flowchart for explaining the operation of the integer precision motion vector detector 206. In the flowchart of FIG. 7, the operation of the integer precision motion vector detector 206 is calculating the sum of absolute differences in pixel values between a target block and a specific reference block, and this calculation is started when the corresponding pixel data of the target block and the reference block are inputted to the integer precision motion vector detector 206.

When the integer precision motion vector detector 206 receives the pixel data of the target block and the corresponding pixel data of the reference block, the calculator 21 calculates the absolute values of differences in pixel values between the pixel data of the target block and the pixel data of the reference block, and outputs the absolute difference values to the subtracter 22 (step S201).

On receipt of each absolute difference value outputted from the calculator 21, the subtracter 22 subtracts the absolute difference value from the threshold value held by the calculator 24 (step S202).

When the absolute difference value is subtracted from the threshold value by the subtracter 22, the counter 23 increments the count value (step S203).

Then, the calculator 24 checks whether the MSB of the threshold value is "1" or not to judge whether or not the threshold value becomes negative as the result of subtraction of the absolute difference value from the threshold value in step S202 (step S204). The MSB "1" indicates that the threshold value is negative, and the MSB "0" indicates that the threshold value is positive.

When the MSB of the threshold value is "1", since the sum of absolute differences of the corresponding reference block cannot be the smallest sum of absolute differences, the value of the counter 23 is reset to "0" (step S209), and the process on this reference block is stopped.

On the other hand, when the MSB of the threshold value is not "1", it is checked whether the value of the counter 23 is "127" or not, i.e., whether all of the absolute difference values of the pixels to be processed have been subtracted from the threshold value or not (step S205).

When the value of the counter 23 is not "127", the absolute difference values of the remaining pixels are calculated (step S201), followed by the same processes as in steps S202 to S205.

On the other hand, when the value of the counter 23 is "127", since this reference block can be a candidate for a reference block having the smallest sum of absolute differences, the calculator 24 outputs the data indicating the position of this reference block and the position of the target block, to the motion vector generator 25 (step S207).

On receipt of the data indicating the positions of the reference block and the target block, the motion vector generator 25 generates a motion vector from the amount of change (step S207). At this time, the motion vector generator 25 updates the previously generated motion vector to the most-recently generated motion vector.

Further, the calculator 24 subtracts the positive threshold value at the time when the value of the counter 23 becomes "127", from the threshold value possessed by the calculator 24. Then, the calculator 24 updates the initial threshold value to the value obtained by the subtraction (step S208).

Thereafter, the calculator 24 sets the value of the counter 23 to "0" (step S209) to end the process on this reference block.

The integer precision motion vector detector 206 subjects other reference blocks in the search area to the above-mentioned process of searching for a reference block having the smallest sum of absolute differences in pixel values with respect to the target block.

Further, when the search on the reference blocks in the reference area is ended, the second address generator 105 outputs a signal indicating that the search is ended, to the integer precision motion vector detector 206. Then, the calculator 24 outputs the initial threshold value at this point of time as an evaluation function, and the motion vector generator 26 outputs the motion vector at this point of time as the motion vector of the target block.

As described above, the integer precision motion vector detector 206 sequentially subtracts the absolute difference values from the threshold value, and when the threshold value becomes negative, the reference block being processed is excluded from the candidates for a reference block having the smallest sum of absolute differences, i.e., calculation on this reference block is aborted, whereby the processing speed is increased and the power consumption is reduced.

Further, whether the reference block being processed can be a candidate for a reference block having the smallest sum of absolute values with respect to the target block or not is judged according to whether the result of subtraction from the threshold value is negative or not. Therefore, this judgement can be made using only the value of the MSS of the threshold value possessed by the calculator 24, leading to further increase in processing speed and further reduction in power consumption.

While in this second embodiment the motion vector detection apparatus detects a motion vector by using the pixel data of the reference block and the target block which have been subjected to checker-pattern subsampling, the present invention is not restricted thereto. Subsampling may be performed in any pattern so long as the motion vector detection apparatus detects a motion vector by using the pixel data of the reference block and the target block.

[Embodiment 3]

Hereinafter, a motion vector detection apparatus according to a third embodiment of the present invention will be described with reference to FIGS. 8 to 10.

Figure 8:
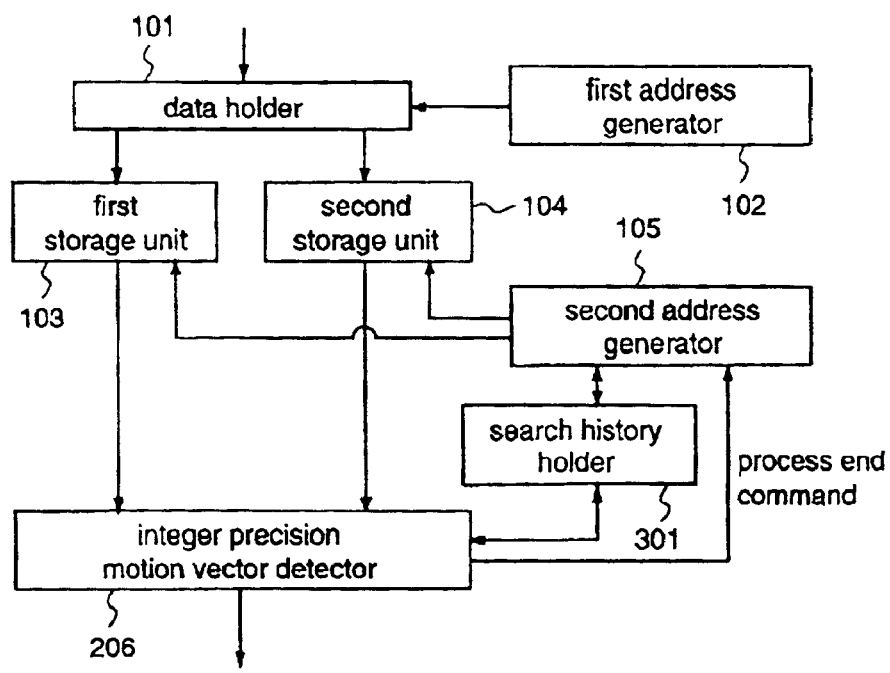
FIG. 8 is a block diagram illustrating a motion vector detection apparatus according to a third embodiment of tho invention.

FIG. 8 is a block diagram illustrating the structure of a motion vector detection apparatus according to the third embodiment. With reference to FIG. 8, the motion vector detection apparatus comprises a data holder 101, a first address generator 102, a first storage unit 103, a second storage unit 104, a second address generator 105, an integer precision motion vector detector 206, and a search history holder 301.

The motion vector detection apparatus according to this third embodiment is different from the motion vector detection apparatus of the second embodiment only in that the histories of reference blocks on which search has been done are stored to avoid double search on the same reference block. Therefore, the same constituents of the motion vector detection apparatus as those already described for the second embodiment are given the same reference numerals, and description thereof will be omitted.

The search history holder 301 holds the histories of reference blocks on which search has already been carried out by the integer precision motion vector detector 206. In this third embodiment, the search history holder 301 holds the histories of nine reference blocks, i.e., a reference block in a position to be searched and eight reference blocks surrounding the reference block.

Hereinafter, a description will be given of the process of searching for a reference block having the smallest sum of absolute differences, utilizing the above-mentioned search histories, with reference to FIGS. 9 and 10.

Figure 9:
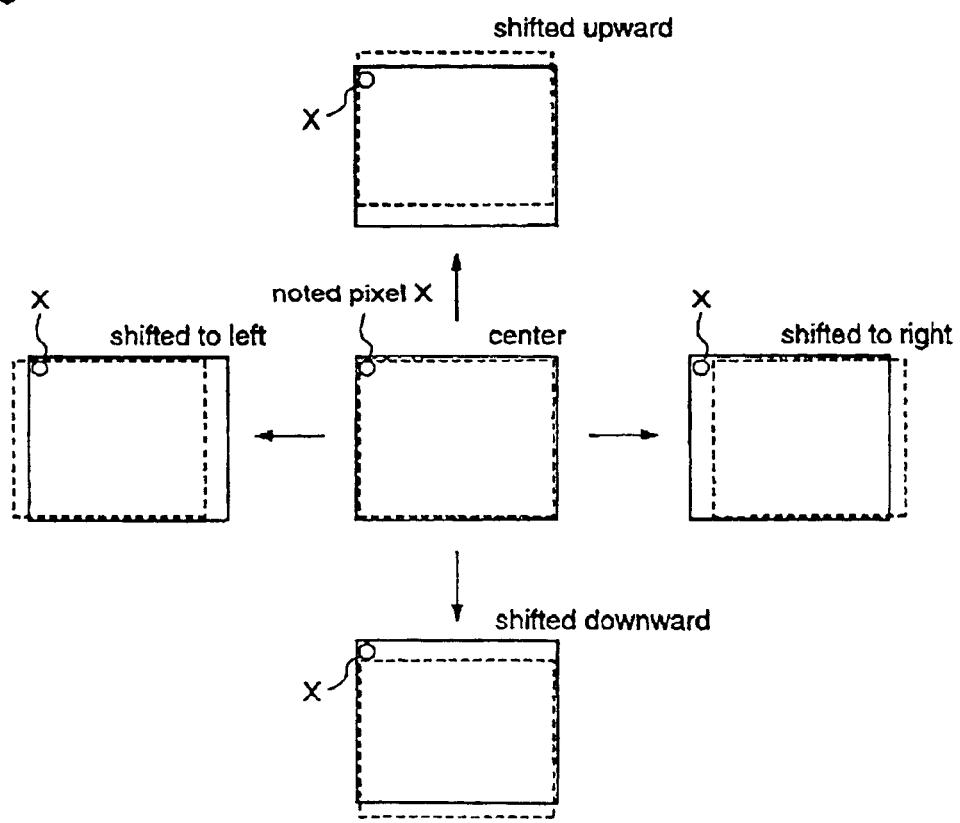
FIG. 9 is a diagram for explaining an example of motion vector search by the motion vector detection apparatus of the third embodiment.
Figure 10:
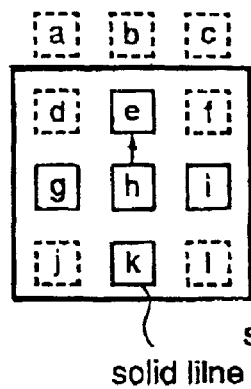
FIGS. 10(a)–10(c) are diagrams illustrating the data structure in a search history holder according to the third embodiment of the invention.
Figure 10:
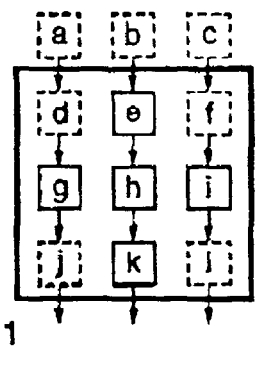
Figure 10:
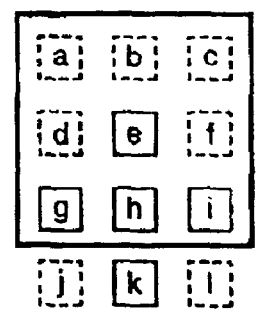

FIG. 9 is a diagram for explaining an example of search by the second address generator 105 according to the third embodiment. In FIG. 9, the solid line shows a target block, and the dotted line shows reference blocks. This search is the process of searching the reference area for a reference block having the smallest sum of absolute differences with respect to the target block.

With reference to FIG. 9, initially, the second address generator 105 generates pixel addresses so that search is performed on five reference blocks. To be specific, with respect to a noted pixel x in the target block, one of the five reference blocks is in the same position as the target block, and other four reference blocks are one pixel shifted from the target block, upward, downward, to the left, and to the right, respectively. Then, the integer precision motion vector detector 206 performs search on these five reference blocks.

The result is outputted to the second address generator 105. When any of the reference blocks shifted upward, downward, to the left, and to the right has the smallest sum of absolute differences, the address generator 105 performs the same process as above on reference blocks that are one pixel shifted upward, downward, to the left, and to the right from the reference block having the smallest sum of absolute values. This process is repeated until the reference block positioned in the center has the smallest sum of absolute differences. When the reference block having the smallest sum of absolute values and positioned in the center is detected, this reference block is regarded as the reference block having the smallest sum of absolute differences with respect to the target block, and the search is ended.

FIGS. 10(a) to 10(c) are diagrams illustrating the data structure inside the search history holder 301, wherein characters a to l indicate reference blocks. A region enclosed in thick solid line 1 shows a range of histories held by the search history holder 301, solid line 2 shows reference blocks on which search has been done, and dotted line 3 indicates reference blocks on which search has not yet been carried out.

For example, assuming that the target block is positioned at h, search is performed on the five reference blocks with respect to the target block as described above. When the search has ended, the search history holder 301 sets flats on the reference blocks e, g, h, i, and k (FIG. 10(a)).

Based on the result of the search by the integer precision motion vector detector 206, when the reference block e has the smallest sum of absolute differences among the reference blocks e, g, h, i, and k with respect to the target block, the search history holder 301 shifts all of the histories held in the holder 301 downward (FIG. 10(b)).

Thereby, the histories in the search history holder 301 are updated to those with the reference block e in the center, for the next search (FIG. 10(c)).

When the second address generator 105 performs search on the reference blocks b, d, e, f, and h with the reference block e in the center, it checks the flags in the search history holder 301, and generates addresses for only the pixel data of the reference blocks b, d, and f on which no flags are set. Therefore, the integer precision motion vector detector 206 is prevented from performing search on the reference blocks e and h on which search has already been performed.

As described above, since the motion vector detection apparatus of this third embodiment is provided with the search history holder 301 to leave search histories of reference blocks on which search has already been carried out, double search on the same reference block is avoided. Thereby, the processing speed is increased and the power consumption is reduced.

While in this third embodiment the second address generator 105 carries out search in the direction to minimize the sum of absolute differences, on the reference blocks positioned above, beneath, on the left, and on the right of the target block, the present invention is not restricted thereto. Any manner of search may be employed so long as the second address generator performs the search on the basis of the search histories held in the search history holder 301.

[Embodiment 4]

Hereinafter, a motion vector detection apparatus according to a fourth embodiment of the present invention will be described with reference to FIGS. 11 to 14.

Figure 11:
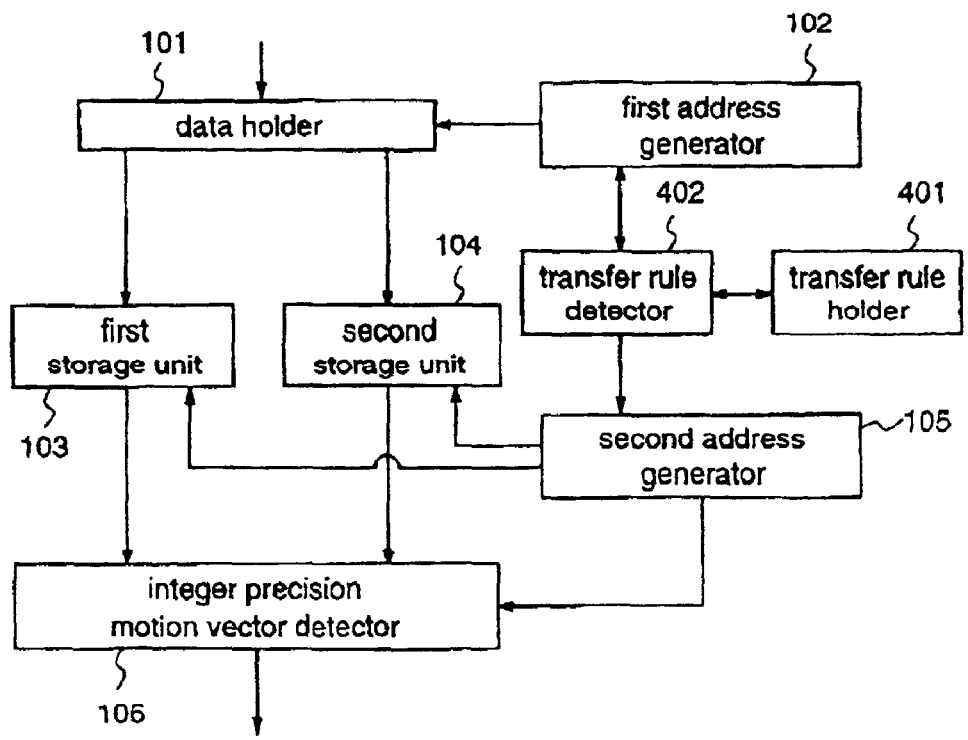
FIG. 11 is a block diagram illustrating a motion vector detection apparatus according to a fourth embodiment of the invention.

FIG. 11 is a block diagram illustrating the structure of a motion vector detection apparatus according to the fourth embodiment. In FIG. 11, the motion vector detection apparatus comprises a data holder 101, a first address generator 102, a first storage unit 103, a second storage unit 104, a second address generator 105, an integer precision motion vector detector 106, a transfer rule holder 401, and a transfer rule detector 402.

The motion vector detection apparatus according to the fourth embodiment is different from the motion vector detection apparatus according to the first embodiment only in that the transfer rule by which reference area data is transferred from the data holder 101 to the first storage unit 103 is changed according to where the reference area data to be outputted to the first storage unit 103 is positioned on the image data held in the data holder 101. Therefore, the same constituents as those described for the first embodiment are given the same reference numerals, and description thereof will be omitted.

The transfer rule holder 401 holds transfer rules in association with area decision codes.

The transfer rule detector 402 detects a transfer rule on the basis of an area decision code outputted from the first address generator 102, and outputs the transfer rule to the first address generator 102 and to the second address generator 105.

Hereinafter, the area decision code will be described in detail with reference to FIG. 12.

Figure 12:
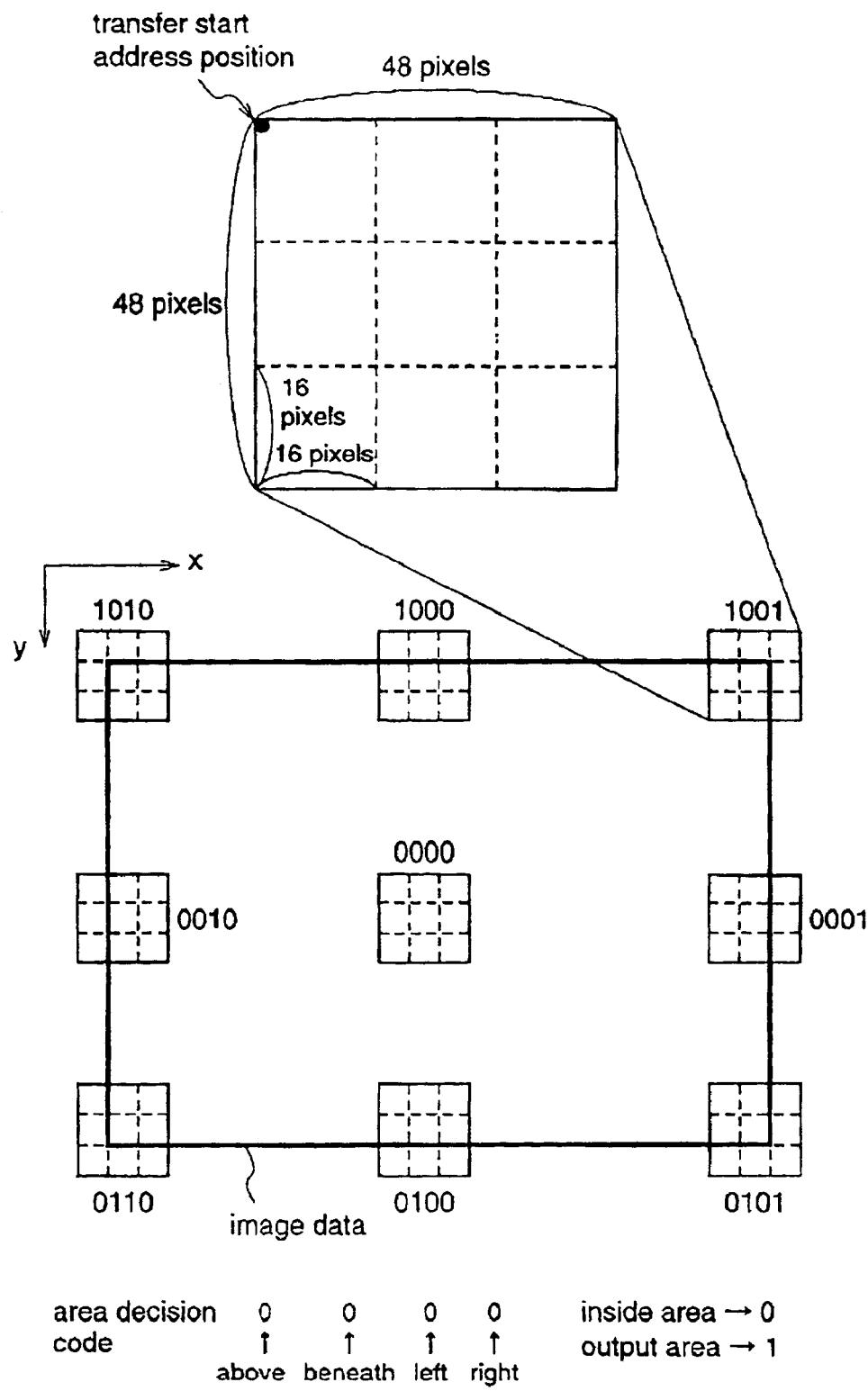
FIG. 12 is a diagram for explaining area decision codes.

FIG. 12 is a diagram illustrating image data, and the area decision code according to the fourth embodiment is a code comprising four bits, indicating where a reference area on which motion vector search is currently carried out is positioned on the image data. The respective bits indicate, from the uppermost bit, upper edge, lower edge, left edge, and right edge. For example, when the bit indicating the upper end is "1", it means that the reference area is positioned at the upper edge of the image data. When this bit is "0", it means that the reference area is not positioned at the upper edge of the image data. This area decision code is stored in the first address generator 102 which controls the addresses of the image data.

Hereinafter, the process of transferring the reference area data by the first address generator 102 will be described with reference to FIGS. 12, 13, and 14.

FIG. 13 is a diagram illustrating examples of area decision codes and transfer rules stored in the transfer rule holder 401. FIG. 14 is a diagram illustrating the addresses of 48×48 pixels constituting the reference area data.

When an area decision code is outputted from the first address generator 102 to the transfer rule detector 402, the transfer rule detector 402 detects a transfer rule corresponding to the area decision code outputted from the transfer rule holder 401.

The transfer rule detected by the transfer rule detector 402 is outputted to the first address generator 102. The first address generator 102 generates transfer addresses of the reference area data to be outputted to the first storage unit 103, on the basis of the detected transfer rule.

For example, when the area decision code is "0000", the first address generator 102 reads data corresponding to 48 pixels of pixel addresses from 0 to 47, one pixel by one pixel in the horizontal direction, starting from the transfer start address position shown in FIG. 12. As shown in FIG. 14, when readout of the data of 48 pixels corresponding to the pixel addresses from 0 to 47 is completed, the transfer start address position is one pixel shifted in the vertical direction with respect to the rectangle image, and then data of 48 pixels in the horizontal direction, corresponding to pixel addresses from 48 to 95, are read from the left end of the rectangle image The shift in the vertical direction is continued until 48 pixels are shifted in the vertical direction with respect to the rectangle image.

When the area decision code is "1010", as shown in FIG. 14, readout of pixel data is started from the position where the pixel address is 784, and data of 32 pixels corresponding to the pixel addresses from 784 to 815 are read out, one pixel by one pixel, in the horizontal direction. When readout of the data of 32 pixels corresponding to the pixel addresses from 784 to 815 is completed, the position corresponding to the pixel address of 784 is one pixel shifted in the vertical direction with respect to the rectangle image, and then data of 32 pixels in the horizontal direction, corresponding to the pixel addresses from 832 to 863, are read out in like manner. This shift in the vertical direction is continued until 32 pixels are shifted in the vertical direction with respect to the rectangle image.

Since the process of transferring the reference area data when the area decision code is "0001", "0010", "0100", "0101", "0110", "1000", or "1001" can be estimated from the above-mentioned case where the area decision code is "0000" or "1010" and FIG. 13, description thereof will be omitted.

As described above, since the transfer rule by which the first address generator 102 transfers the reference area data to the first storage unit 103 is changed according to the position of the reference area data on the image data, the amount of data to be transferred to the first storage unit 103 is minimized, resulting in increased processing speed and reduced power consumption.

While in this fourth embodiment the first address generator 102 holds the area decision codes, the present invention is not restricted thereto. For example, the user may input an area decision code directly to the transfer rule detector 402.

While in this fourth embodiment the transfer rule shown in FIG. 13 is employed in association with the area decision code, the present invention is not restricted thereto. Any transfer rule may be employed so long as the first address generator 102 can generate transfer addresses of data according to the transfer rule corresponding to the area decision code.

[Embodiment 5]

Hereinafter, a motion vector detection apparatus according to a fifth embodiment of the present invention will be described with reference to FIGS. 15 to 17.

Figure 15:
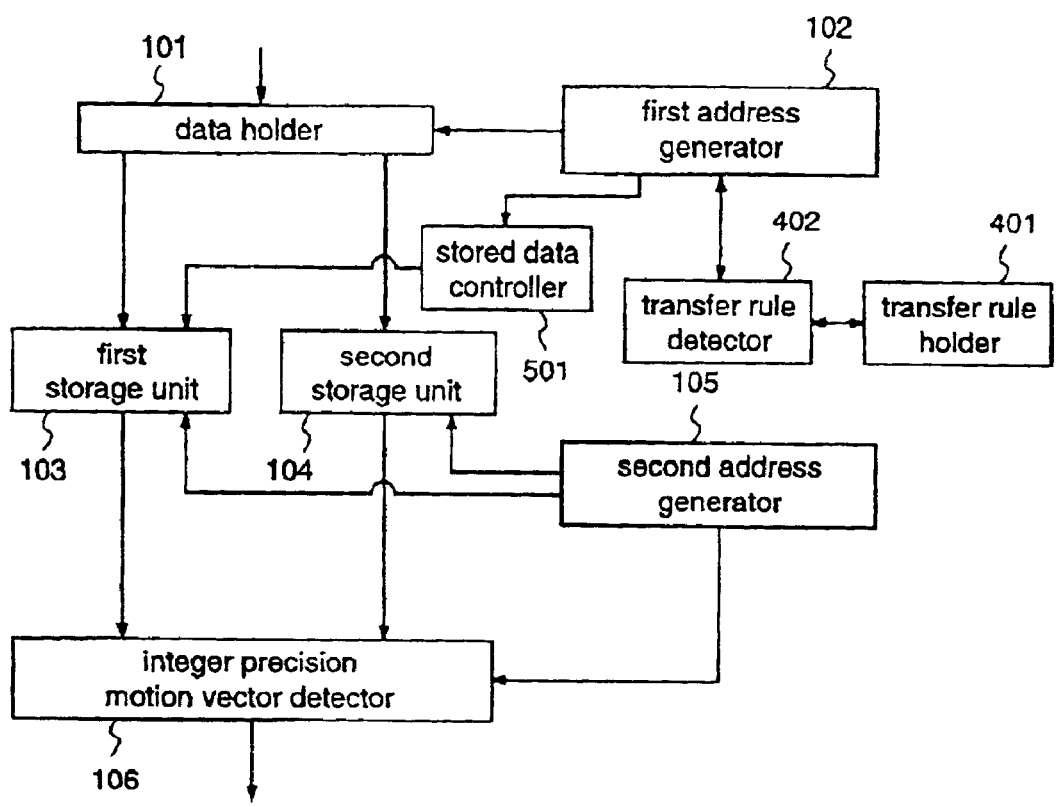
FIG. 15 is a block diagram illustrating a motion vector detection apparatus according to a fifth embodiment of the invention.

FIG. 15 is a block diagram illustrating the structure of a motion vector detection apparatus according to the fifth embodiment. With reference to FIG. 15, the motion vector detection apparatus comprises a data holder 101, a first address generator 102, a first storage unit 103, a second storage unit 104, a second address generator 105, an integer precision motion vector detector 106, a transfer rule detector 402, a transfer rule holder 401, and a stored data controller 501.

The motion vector detection apparatus according to this fifth embodiment is different from the motion vector detection apparatus according to the fourth embodiment only in that the first storage unit 103 has a double buffer structure, and the data stored in the first storage unit 103 are controlled by the stored data controller 501. Therefore, the same constituents as those already described for the fourth embodiment are given the same reference numerals, and description thereof will be omitted.

First of all, the memory structure (double buffer structure) of the first storage unit 103 will be described with reference to FIG. 16.

Figure 16:
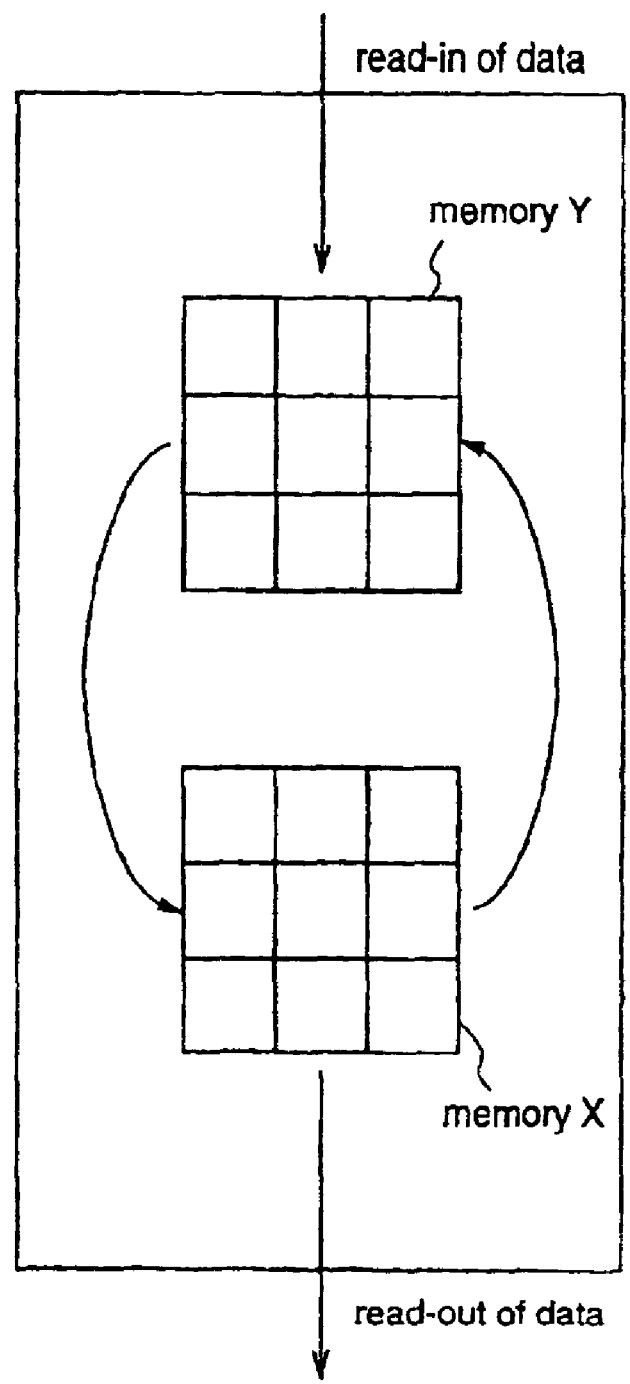
FIG. 16 is a diagram for explaining the memory structure of a first storage unit according to the fifth embodiment of the invention.

FIG. 16 is a diagram for explaining the memory structure of the first storage unit 103 according to the fifth embodiment With reference to FIG. 16, the first storage unit 103 has two buffer memories X and Y. For example, while reading of data into the memory Y is carried out, reading of data from the memory X is carried out. When both of these processes are ended, the memory X and the memory Y are interchanged, and reading of data into the memory X is carried out while reading of data from the memory Y is carried out. Thereby, data input/output is performed with efficiency.

Next, the operation of the stored data controller 501 will be described.

Generally, when detecting motion vectors from plural blocks constituting image data, these target blocks are one by one shifted from the block positioned at the upper left edge of the image data, and a motion vector is detected for each target block. Therefore, when performing input/output of data in/from a reference area as a search area by using the first storage unit 103 having the above-mentioned double buffer structure, pixel data overlap between the memory X and memory Y, whereby overlapped data transfer is carried out every time the target block changes.

Figure 17:
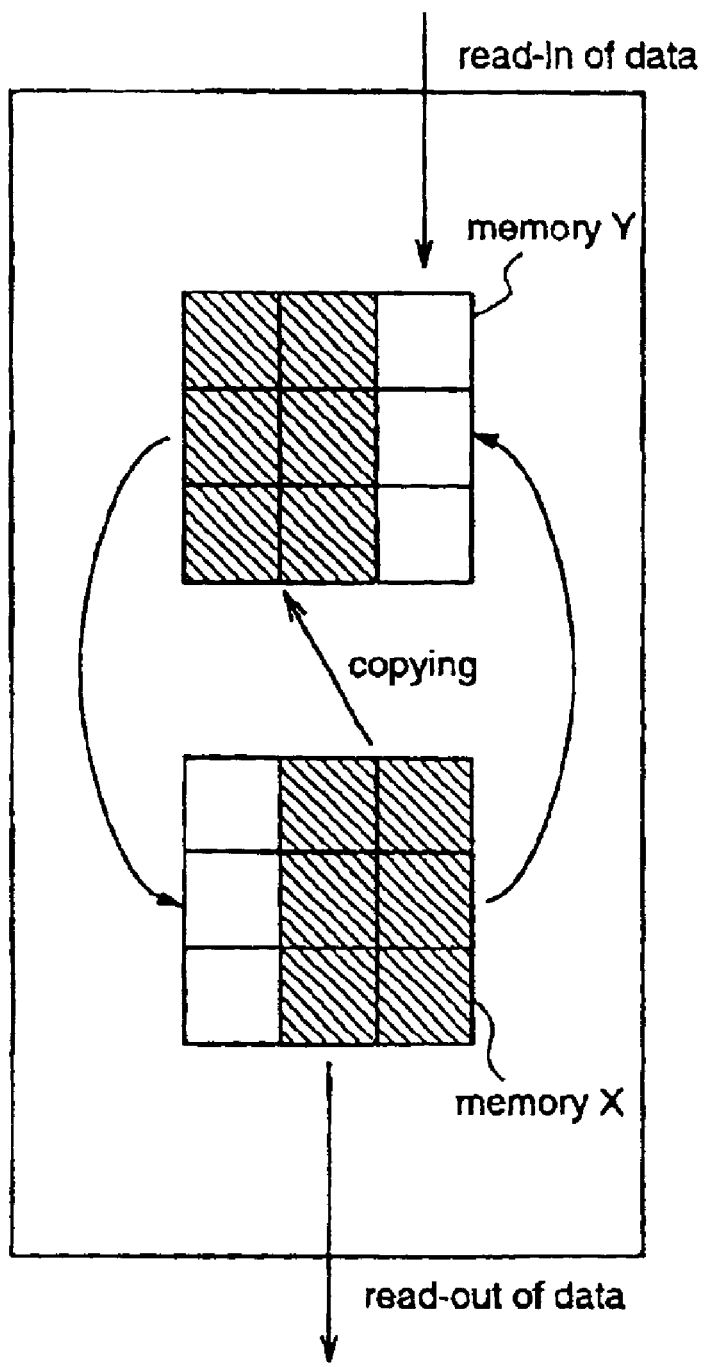
FIG. 17 is a diagram for explaining data processing in tho first storage unit of the fifth embodiment.

In order to solve this problem, as shown in FIG. 17, the stored data controller 501 according to tho fifth embodiment transfers data that are stored in the memory X and are required for the memory Y, among the data stored in the first storage unit 103 having the double buffer structure, from the memory X to the memory Y. Thereafter, the controller 501 reads the data required for the memory Y from the data storage unit 101 into the memory Y. Similar processing is carried out when transferring data from the memory Y to tho memory X.

The stored data controller 501 determines the range of data in the first storage unit 103 where copying is carried out, on the basis of the area decision code outputted from the first address generator 102. Since the area decision code is identical to that already described for the fourth embodiment, repeated description is not necessary.

Hereinafter, the operation of the stored data controller 501 will be described with reference to FIG. 18.

Figure 18:
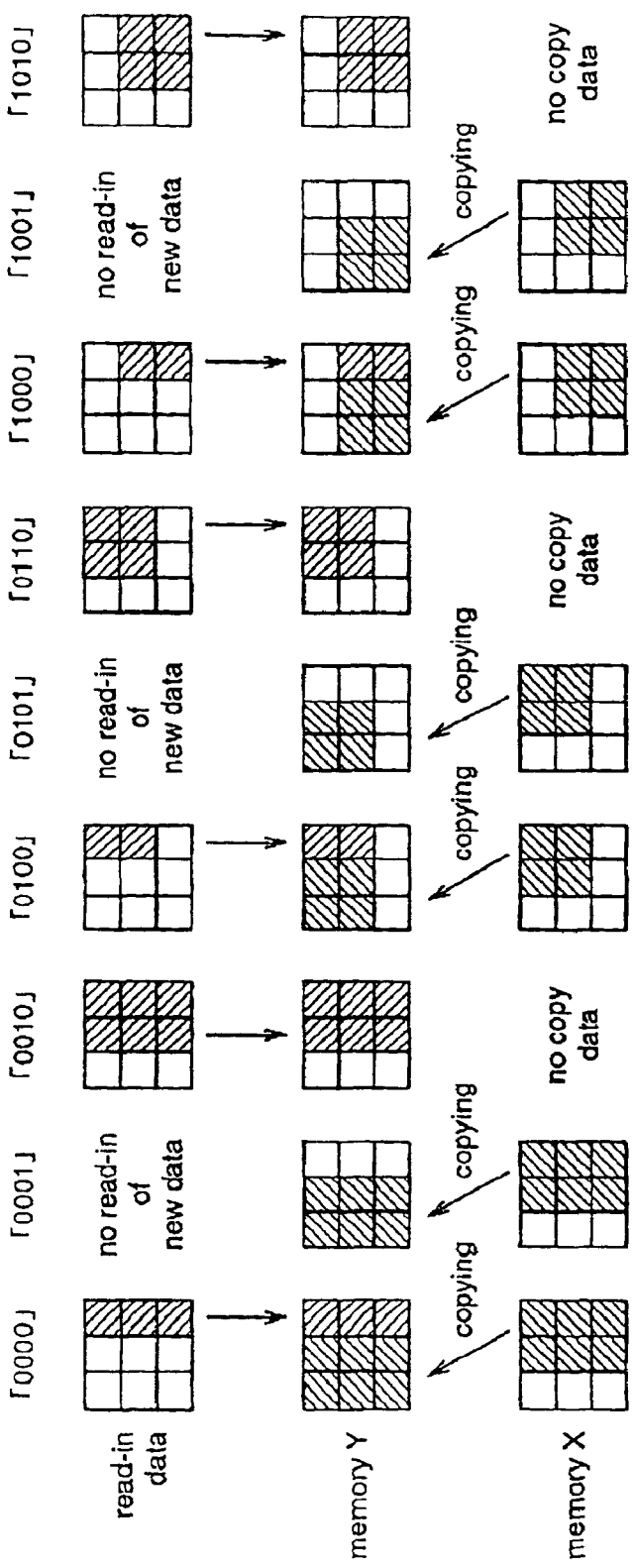
FIG. 18 is a diagram illustrating area decision codes, data to be newly read into the first storage unit, and data to be copied in the first storage unit.

FIG. 18 is a diagram illustrating the relationships among the area decision code, the data to be newly read into the first storage unit 103, and the data to be copied in the first storage unit 103.

For example, as shown in FIG. 18, when the area decision code for reading of data into the memory Y is "0000", the stored data controller 501 copies, among the data stored in the memory X, data corresponding to 6 blocks on the right side, into the left section of the memory Y. Thereby, the data storage unit 103 newly reads only data corresponding to the remaining three blocks on the right side, from the data holder 101.

When the area decision code for reading of data into the memory Y is "0001", the stored data controller 501 copies, among the data stored in the memory X, data corresponding to six blocks on the right side, into the left section of the memory Y. When the area decision code is "0001", i.e., when the right-end bit is "1", since there exists no data of blocks positioned on the right side, data read-in is not carried out.

When the area decision code for reading of data into the memory Y is "0010", the stored data controller 501 does not perform copying of data as shown in FIG. 18. The reason is as follows. As described above, when detecting motion vectors from plural blocks, since the target block to be processed is sequentially shifted to the right, if the area decision code is "0010" (i.e., when the second bit from the right is "1"), the target block is positioned at the left edge of the image data and, therefore, the data used for the previous search cannot be used.

Even when the area decision code is other than those mentioned above, the operation of the stored data controller 501 can be estimated from FIG. 18 and the above-mentioned case where the area decision code is "0000", "0001", or "0010" and, therefore, repeated description is not necessary.

As described above, since the stored data controller 501 controls the data stored in the first storage unit 103 by using the area decision code, the amount of data to be read from the data holder 101 is reduced, resulting in increased processing speed and reduced power consumption.

While in this fifth embodiment the first address generator 102 holds the area decision codes, the present invention is not restricted thereto. For example, the user may input an area decision code directly into the stored data controller 501.

Further, in the motion vector detection apparatus according to this fifth embodiment, the data holder 101 and the second storage unit 104 may have any memory structure so long as the first storage unit 103 has the double buffer structure.

Further, while in the first to fifth embodiments the motion vector detector for detecting motion vectors is the integer precision motion vector detector 106 for detecting motion vectors of integer precision, the present invention is not restricted thereto. For example, the motion vector detector may detect decimal precision motion vectors, or both of integer precision motion vectors and decimal precision motion vectors. Detection of decimal precision motion vectors will be described for a sixth embodiment as follows.

[Embodiment 6]

Hereinafter, a motion vector detection apparatus according to a sixth embodiment of the present invention will be described with reference to FIGS. 10 to 22.

Figure 19:
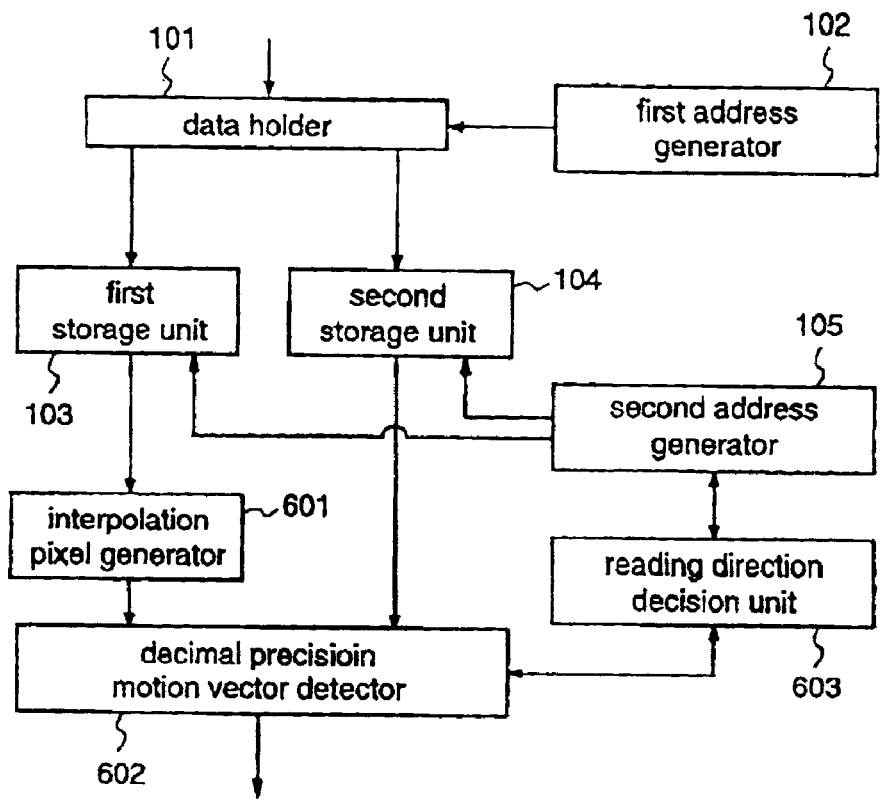
FIG. 19 is a block diagram illustrating a motion vector detection apparatus according to a sixth embodiment of the invention.

FIG. 19 is a block diagram illustrating the structure of a motion vector detection apparatus according to the sixth embodiment. With reference to FIG. 19, the motion vector detection apparatus comprises a data holder 101, a first address generator 102, a first storage unit 103, a second storage unit 104, a second address generator 105, an interpolation pixel generator 601, a decimal precision motion vector detector 602, and a reading direction decision unit 603.

The interpolation pixel generator 601 obtains, by interpolation, a pixel value in an arbitrary position between pixels of reference area data stored in the first storage unit 103. In this sixth embodiment, it is premised that, for simplification, the interpolation pixel generator 601 generates a half pixel that is a pixel value positioned at the midpoint between two pixels.

Figure 20:
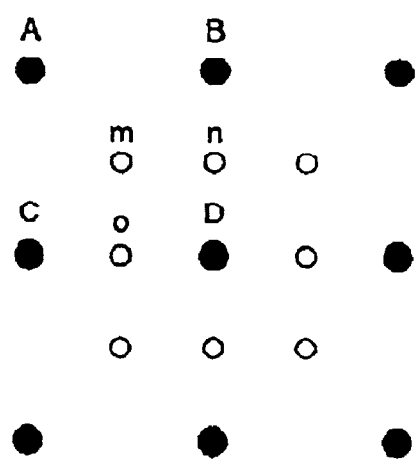
FIG. 20 is a diagram for explaining an interpolation pixel generator according to the sixth embodiment of the invention.

FIG. 20 is a diagram for explaining the interpolation pixel generator 601 according to the sixth embodiment. In FIG. 20, black dots indicate the positions of pixels, and while dots indicate the positions of half pixels obtained by the interpolation pixel generator 601. For example, in order to generate a half pixel m, data of pixel values of four pixels A, B, C, and D surrounding the half pixel m are required, and the interpolation pixel generator 601 calculates, $$\text{half pixel } m = (\text{pixel } A + \text{pixel } B + \text{pixel } C + \text{pixel } D)/4$$

to obtain the pixel value of half pixel m.

Further, in order to generate a half pixel n, data of pixel values of two pixels B and D existing in the vertical direction are required, and the interpolation pixel generator 601 calculates, $$\text{half pixel } n = (\text{pixel } B + \text{pixel } D)/2$$

to obtain the pixel value of half pixel n.

Furthermore, in order to generate a half pixel o, data of pixel values of two pixels C and D existing in the horizontal direction are required, and the interpolation pixel generator 601 calculates, $$\text{half pixel } o = (\text{pixel } C + \text{pixel } D)/2$$

to obtain the pixel value of half pixel o.

The decimal precision motion vector detector 602 calculates the sum of absolute differences in pixel values between the target block and the half pixel precision reference block that is ½ pixel shifted from the reference block, by using the half pixel data that is generated by the interpolation pixel generator 601 using the pixel data of the reference block outputted from the first storage unit 103, and the pixel data of the target block outputted from the second storage unit 104. Then, the motion vector detector 602 searches for a half-pixel-precision reference block that provides the smallest sum of absolute differences, thereby detecting a motion vector. The process of searching for the half-pixel-precision reference block by the decimal precision motion vector detector 601 is advanced in the direction where the smallest half-pixel-precision reference block exists in the vicinity of the target block position, and this direction is outputted as a search position vector to the reading direction decision unit 603.

The reading direction decision unit 603 decides the direction of reading the pixel data in the reference area from the first storage unit 103, according to the position of the half pixel data generated by the interpolation pixel generator 601. The position of the half pixel data generated by the interpolation pixel generator 601 is determined on the basis of the search position vector outputted from the decimal precision motion vector detector 602.

Hereinafter, a description will be given of the process of generating half pixels by the motion vector detection apparatus according to the sixth embodiment, with reference to FIGS. 21 and 22.

Figure 21:
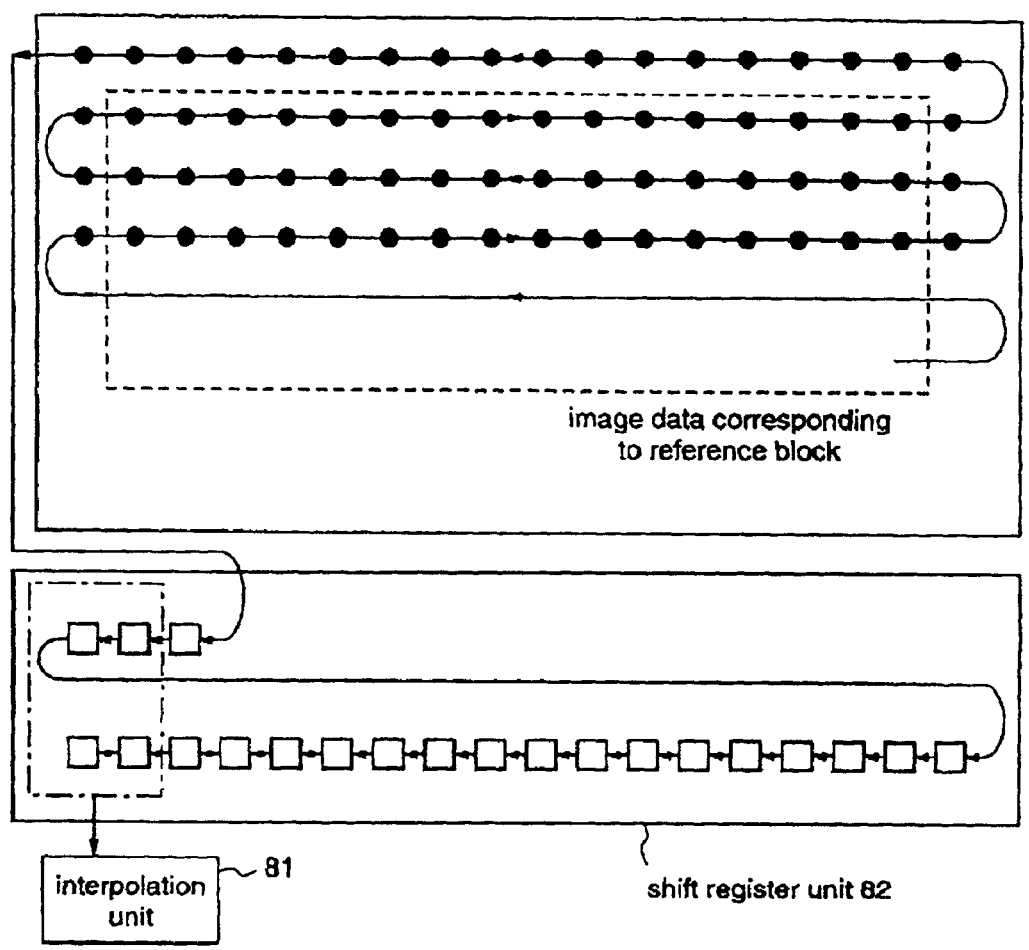
FIG. 21 is a diagram for explaining the process of generating half-pixel data by the interpolation pixel generator of the sixth embodiment.
Figure 22:
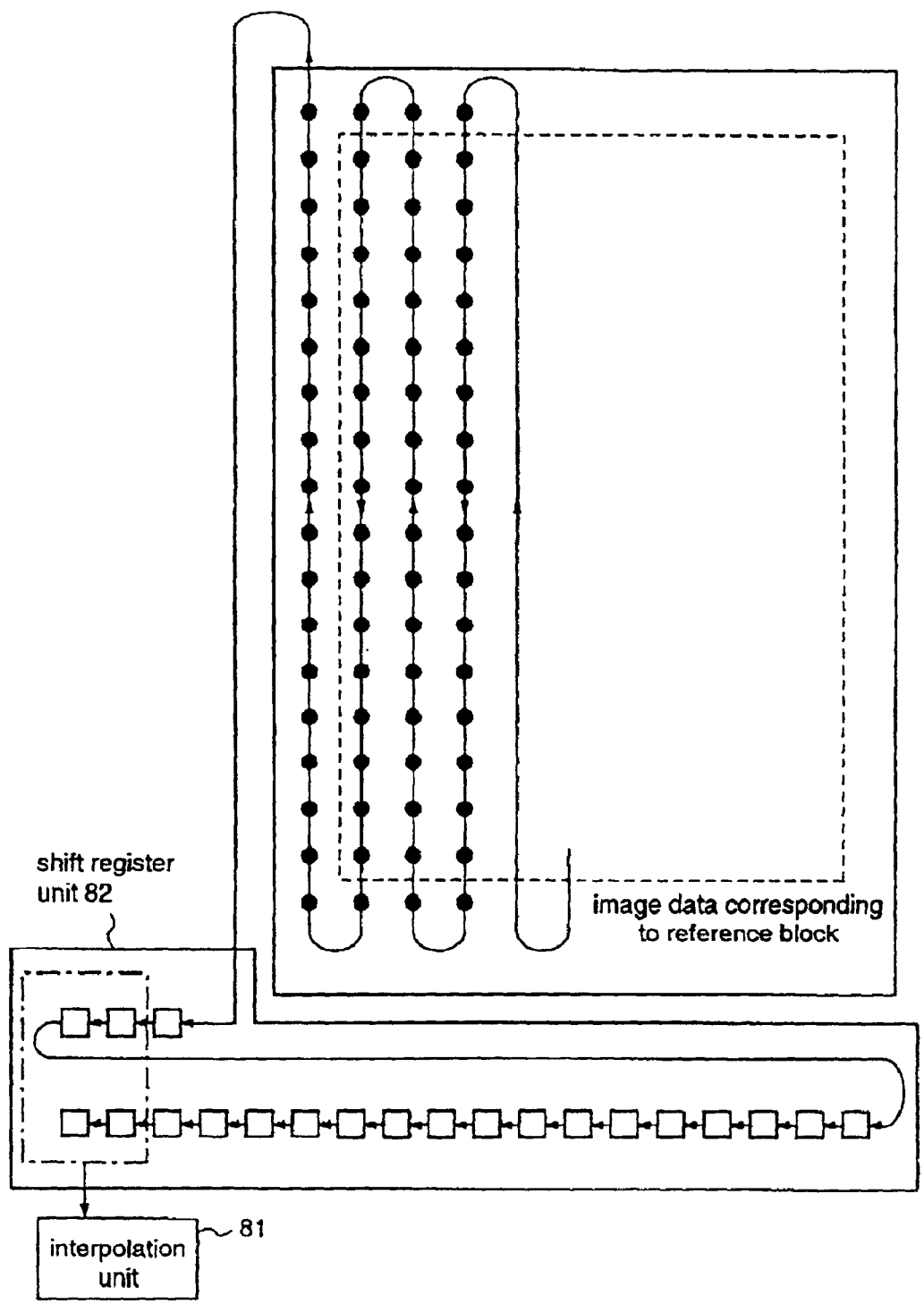
FIG. 22 is a diagram for explaining the process of generating half-pixel data by the interpolation pixel generator of the sixth embodiment.

FIGS. 21 and 22 are diagram for explaining the process of generating half pixel data by the interpolation pixel generator 601. With reference to FIGS. 21 and 22, the interpolation pixel generator 601 comprises an interpolation unit 81 and a shift register unit 82.

The interpolation unit 81 performs interpolation on the pixel data stored in the shift register unit 82, and calculates a pixel value in an arbitrary position between pixels. The shift register unit 81 comprises twenty-one shift registers, and shifts the stored pixel data every time pixel data is inputted. In this sixth embodiment, it is premised that a pixel value of half pixel precision, that is positioned at the midpoint between two pixels, is obtained.

When the interpolation pixel generator 601 generates a half-pixel precision reference block that is ½ pixel shifted from the reference block to left, right, upper right, lower right, upper left, or lower left, the reading direction decision unit 603 instructs the second address generator 105 to read the data in the reference area stored in the first storage unit 103, in the horizontal direction. Then, as shown in FIG. 21, the second address generator 105 reads the data positioned in the horizontal direction, 18 pixels by 18 pixels, from the pixel data in the reference area stored in the first storage unit 103, for 18 times in the vertical direction.

The read pixel data are inputted to the shift register unit 82 in the interpolation pixel generator 601, wherein interpolation is carried out by the interpolation unit 81.

The shift register unit 82 in the interpolation pixel generator 601 possesses, at least, (the number of data to be read in the horizontal direction+2) pieces of shift registers. Therefore, even when generating pixel data that are ½ pixel shifted in the diagonal direction, interpolation of the pixel data that are ½ pixel shifted in the diagonal direction can be carried out without the need for data reading, resulting in increased processing speed and reduced power consumption.

On the other hand, when the interpolation pixel generator 601 generates a half pixel precision reference block that is ½ pixel shifted from the reference block, upward, downward, to upper right, lower right, upper left, or lower left, the reading direction decision unit 603 instructs the second address generator 105 to read the data in the reference area stored in the first storage unit 103, in the vertical direction. Then, as shown in FIG. 22, the second address generator 105 reads the data positioned in the vertical direction, 18 pixels by 18 pixels, from the pixel data in the reference area stored in the first storage unit 103, for 18 times in the horizontal direction.

The read pixel data are inputted to the shift register unit 82 in the interpolation pixel generator 601, wherein interpolation is carried out by the interpolation unit 81.

In this way, since the pixel data ½ pixel shifted in the vertical direction are generated by using the pixel data that are read in the vertical direction, the amount of calculation for interpolation of the pixel data ½ pixel shifted in the vertical direction is reduced, resulting in increased processing speed and reduced power consumption.

Further, the shift register unit 82 in the interpolation pixel generator 601 possesses, at least, (the number of data to read in the vertical direction+2) pieces of shift registers. Therefore, even when generating pixel data that are ½ pixel shifted in the diagonal direction, interpolation of the pixel data ½ pixel shifted in the diagonal direction can be carried out without the need for data reading, resulting in increased processing speed and reduced power consumption.

That is, since the data reading direction on the image is changed according to the interpolation positions of pixels, the half pixels n and o that are ½ pixel shifted in the vertical direction and in the horizontal direction, respectively, can be generated at high speed and at the same timing, without altering the structure of the interpolation pixel generator 601, resulting in increased processing speed and reduced power consumption. Further, also when generating the half pixels m that are ½ pixel shifted in the diagonal direction, since the shift register unit 82 possesses at least 20 shift registers, the half-pixel data can be generated at high speed and at the same timing, resulting in reduced amount of data to be transferred, increased processing speed, and reduced power consumption.

While in this sixth embodiment the interpolation pixel generator 601 is provided with the shift register unit 82 having 21 shift registers, the present invention is not restricted thereto. For example, a shift register unit having at least two shift registers is good enough for generating pixel data that are ½ pixel shifted upward, downward, to left, and to right. Further, a shift register unit having at least twenty shift registers is good enough for generating pixel data that are ½ pixel shifted in the diagonal direction.

[Embodiment 7]

Hereinafter, a motion vector detection apparatus according to a seventh embodiment of the present invention will be described with reference to FIGS. 23 and 24.

Figure 23:
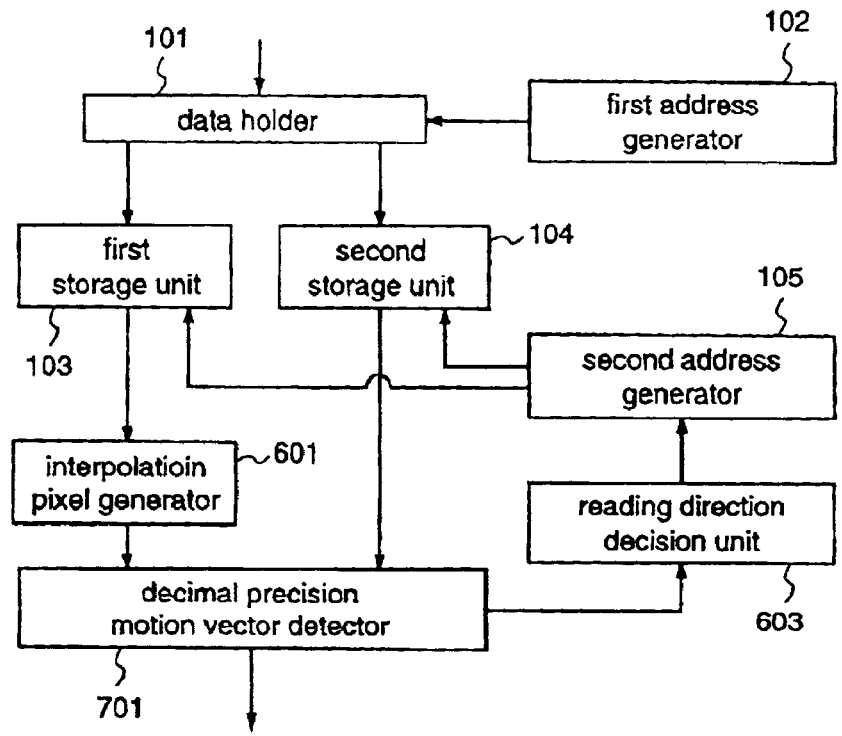
FIG. 23 is a block diagram illustrating a motion vector detection apparatus according to a seventh embodiment of the invention.

FIG. 23 is a block diagram illustrating the structure of a motion vector detection apparatus according to the seventh embodiment. With reference to 23, the motion vector detection apparatus comprises a data holder 101, a first address generator 102, a first storage unit 103, a second storage unit 104, a second address generator 105, an interpolation pixel generator 601, a reading direction decision unit 603, and a decimal precision motion vector detector 701.

The motion vector detection apparatus of this seventh embodiment is different from the motion vector detection apparatus of the sixth embodiment only in that the decimal precision motion vector detector 701 contains two calculators for calculating the sum of absolute differences to perform block matching between a target block and two decimal precision reference blocks at the same time. So, the same constituents as those described for the sixth embodiment are given the same reference numerals, and description thereof will be omitted.

Hereinafter, a description will be given of the process of detecting a decimal precision motion vector, by the motion vector detection apparatus of the seventh embodiment.

As described for the first embodiment, the second address generator 105 generates addresses of pixel data that are obtained by checker-pattern subsampling on a target block and a reference block.

However, in the interpolation pixel generator 601 according to this seventh embodiment, in order to generate a half pixel precision reference block corresponding to pixel data of a target block that is subjected to checker-pattern subsampling and is outputted from the second storage unit 104, it is necessary to read all of pixel data constituting the reference block and the peripheral pixel data abutting the reference block.

Therefore, the interpolation pixel generator 601 generates data of decimal-precision pixels of two half pixel precision target blocks corresponding to the target block that has been subjected to checker-pattern sampling, by using all of pixel data constituting the reference block read from the first storage unit 103, and the peripheral pixel data abutting the reference block. For example, the interpolation pixel generator 601 generates two half pixel precision reference blocks that are ½ pixel shifted, from the integer-precision reference block, upward and downward, to left and to right, diagonally to upper right and diagonally to lower right, diagonally to upper left and diagonally to lower left, diagonally to upper right and diagonally to upper left, or diagonally to lower right and diagonally to lower left. Thereafter, the interpolation pixel generator 601 outputs the data so generated to the decimal-precision motion vector detector 701.

At this time, the pixel data of the two decimal-precision reference blocks, which are ½ pixel shifted upward and downward from the integer-precision reference block, are identical in pixel values except the pixel data in the uppermost line and the lowermost line of the pixel matrixes, respectively. Therefore, the amount of data to be processed by the interpolation pixel generator 601 can be reduced. The same holds true for the data of decimal-precision pixels of two half pixel precision reference blocks that are ½ pixel shifted to left and to right, diagonally to upper right and diagonally to lower right, diagonally to upper left and diagonally to lower left, diagonally to upper right and diagonally to upper left, or diagonally to lower right and diagonally lower left.

Hereinafter, the structure of the decimal-precision motion vector detector 701 will be described with reference to FIG. 24.

Figure 24:
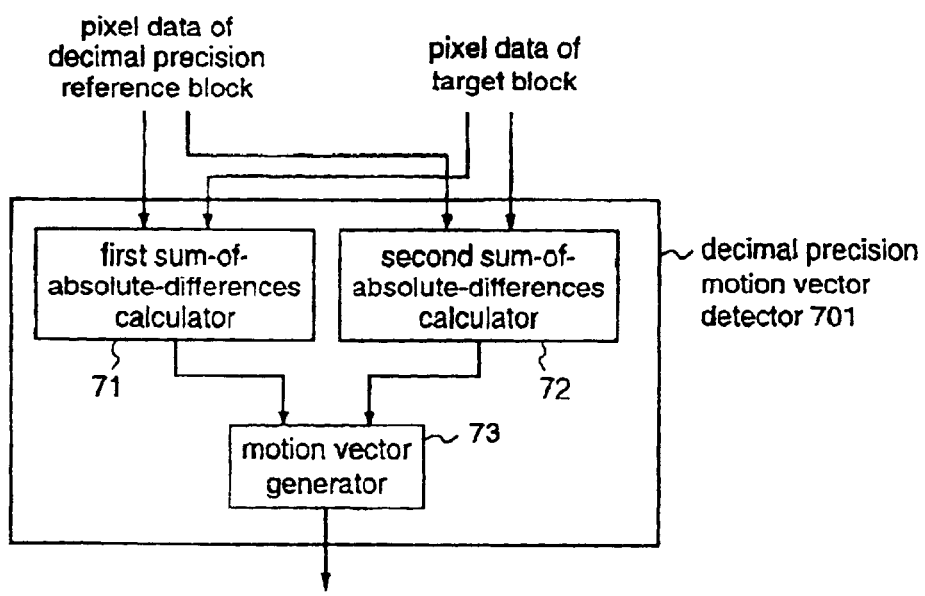
FIG. 24 is a block diagram illustrating a decimal precision motion vector detector according to the seventh embodiment of the invention.

FIG. 24 is a block diagram illustrating the structure of the decimal-precision motion vector detector 701 according to the seventh embodiment. With reference to FIG. 24, the decimal-precision motion vector detector 701 comprises a first calculator 71 for calculating the sum of absolute differences, a second calculator 72 for calculating the sum of absolute differences, and a motion vector generator 73.

Each of the first calculator 71 and the second calculator 72 obtains the sum of absolute values of differences in pixel data between the target block and the half pixel precision reference block, by using the pixel data of the target block that has been subjected to checker-pattern subsampling, and the pixel data of the half pixel precision reference block corresponding to the pixel data of the target block.

The motion vector generator 73 generates a motion vector from the position of the decimal-precision reference block that provides the smaller sum of absolute differences with respect to the target block, which is calculated by either the first calculator 71 or the second calculator 12.

For example, when the decimal-precision motion vector detector 701 performs block matching of the target block that has been subjected to checker-pattern subsampling, with the two half pixel precision reference blocks that are ½ pixel shifted to left and to right with respect to the target block, the pixel data of the half pixel precision target block that is ½ pixel shifted to left, and the pixel data of the target block are supplied from the interpolation pixel generator 601 to the first calculator 71, while the pixel data of the half pixel precision target block that is ½ pixel shifted to right, and the pixel data of the target block are supplied from the interpolation pixel generator 601 to the second calculator 71.

In the first calculator 71 (the second calculator 72), the sum of absolute differences in pixel values between the target block that has been subjected to checker-pattern subsampling and the decimal precision reference block that is ½ pixel shifted to right (left) from the target block is calculated, and the result is outputted to the motion vector generator 73.

The motion vector generator 73 compares the sum of absolute differences outputted from the first calculator 71 with that outputted from the second calculator 72, and detects a motion vector from the decimal precision reference block providing the smaller sum of absolute differences.

In this way, even when all of pixel data constituting the reference block stored in the first storage unit 103 is read out to generate decimal precision interpolation pixels that are used for detection of a decimal precision motion vector with respect to the sub-sampled target block, since the decimal precision motion vector detector 701 is provided with two calculators for calculating the sum of absolute differences and the interpolation pixel generator 601 generates two half pixel precision reference blocks at the same time, calculation of the sum of absolute differences can be simultaneously carried out for the two half pixel precision target blocks that are ½ pixel shifted, upward and downward, to left and to right, diagonally to upper right and diagonally to lower right, diagonally to upper left and diagonally to lower left, diagonally to upper right and diagonally to upper left, or diagonally to lower right and diagonally to lower left. Thereby, the amount of data to be processed by the interpolation pixel generator 601 is reduced, and the amount of data to be read from the first storage unit 103 is reduced, resulting in increased processing rate and reduced power consumption.

While in this seventh embodiment the second address generator 105 generates addresses of pixels that are sampled from the target block in a checker pattern, the present invention is not restricted thereto. For example, the second address generator 105 may generate addresses of all pixels constituting the target block. Thus, the manner of generating pixel addresses by the second address generator 105 is not limited.

[Embodiment 8]

Hereinafter, a motion vector detection apparatus according to an eighth embodiment of the present invention will be described with reference to FIGS. 25 and 26.

Figure 25:
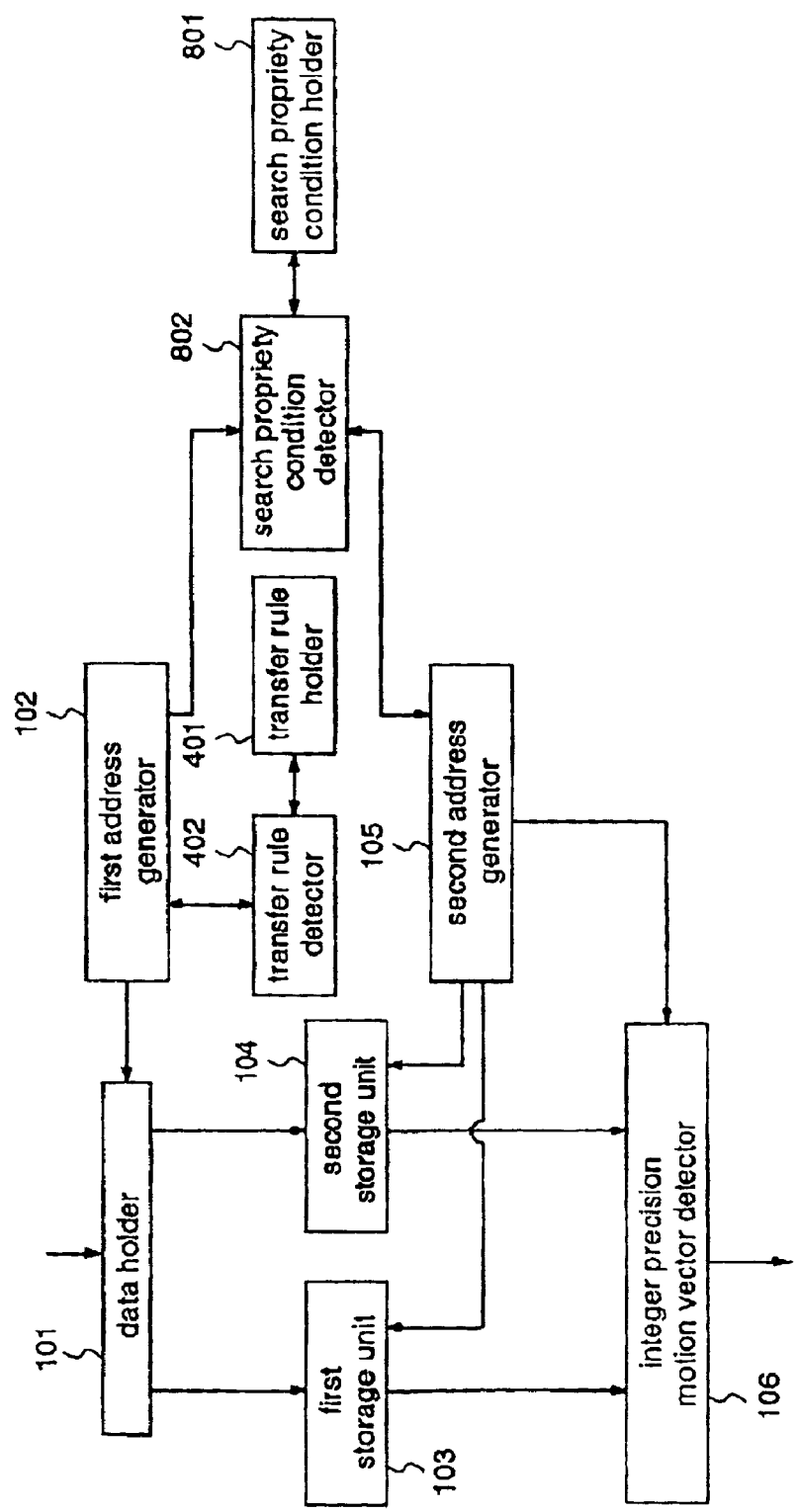
FIG. 25 is a block diagram illustrating a motion vector detection apparatus according to an eighth embodiment of the invention.
Figure 26:
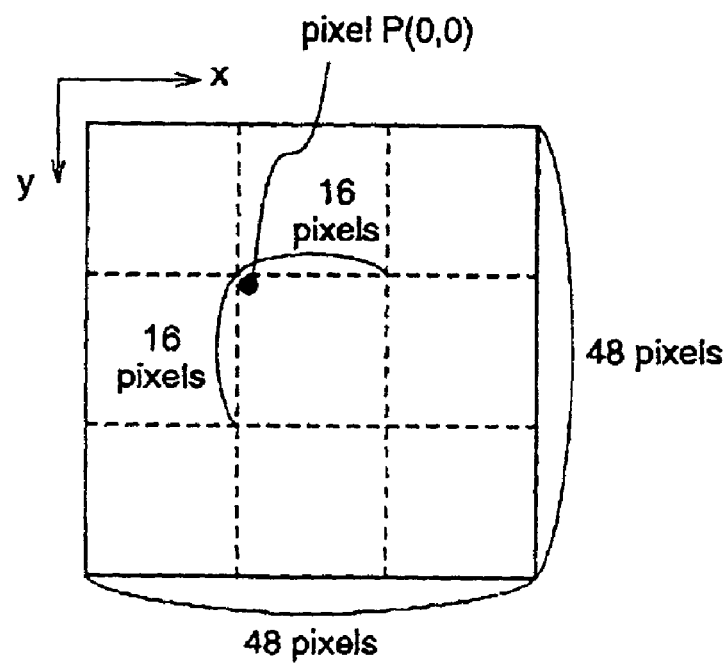
FIG. 26(a) is a diagram illustrating an example of area decision codes and search propriety conditions, which are stored in a search propriety condition holder according to the eighth embodiment of the invention.
FIG. 26(b) is a diagram for explaining the search propriety conditions shown in FIG. 26(a).

FIG. 25 is a block diagram illustrating the structure of a motion vector detection apparatus according to the eighth embodiment. With reference to FIG. 25, the motion vector detection apparatus comprises a data holder 101, a first address generator 102, a first storage unit 103, a second storage unit 104, a second address generator 105, an integer precision motion vector detector 106, a transfer rule holder 401, a transfer rule detector 402, a search propriety condition holder 801, and a search propriety condition detector 802.

The motion vector detection apparatus according to this eighth embodiment is different from the motion vector detection apparatus according to the fourth embodiment only in that the second address generator 105 generates addresses of pixel data in a reference block outputted from the first storage unit 103, on the basis of the search propriety condition that is detected by the search propriety condition detector 802. Therefore, the same constituents as those described for the fourth embodiment are given the same reference numerals, and description thereof will be omitted.

The search propriety condition holder 801 holds area decision codes in association with search propriety conditions for judging whether the corresponding area is in a searchable position or not.

The search propriety condition detector 802 detects a search propriety condition from the search propriety condition holder 801 on the basis of an area decision code outputted from the first address generator 102, and outputs it to the second address generator 105.

Since the area decision code is identical to the area decision code that has already been described for the fourth embodiment with reference to FIG. 13, repeated description is not necessary.

Hereinafter, a description will be given of the process of generating addresses of pixel data in a reference block by the second address generator 105, with reference to FIG. 25 and FIGS. 26(a) and 26(b).

FIG. 26(a) shows examples of area decision codes and search propriety conditions, which are stored in the search propriety condition holder 801. To be specific, FIG. 26(a) shows search propriety conditions stored in the search propriety condition holder 801 in the case where, as shown in FIG. 26(b), the horizontal axis that is positive toward the right is the x axis, the vertical axis that is positive downward is the y axis, and the position of pixel p is the origin. The search propriety conditions shown in FIG. 26(a) indicate areas in which search is possible.

When an area decision code is outputted from the first address generator 102 to the search propriety condition detector 802, the detector 802 detects a search propriety condition corresponding to this area decision code from the search propriety condition holder 801, and outputs it to the second address generator 105.

The second address generator 105 generates addresses of pixel data outputted from the first storage unit 103, on the basis of the search propriety condition outputted from the detector 802.

Next, the operation of the motion vector detection apparatus according to the eighth embodiment will be described.

When the area decision code outputted from the first address generator 102 is "0000", the search propriety condition detector 802 detects the search propriety condition "$-16 \leq x \leq 15, -16 \leq y \leq 15$" from the search propriety condition holder 801, and outputs it to the second address generator 105.

The second address generator 105 generates pixel addresses within the range of "$-16 \leq x \leq 15, -16 \leq y \leq 15$", on the basis of the search propriety condition detected by the detector 802.

Since the manner of detecting the search propriety condition when the area decision code is "0001", "0010", "0100", "0101", "0110", "1000", "1001", or "1010" is identical to that described for "0000", repeated description is not necessary.

In this way, the search propriety condition detector 802 detects the search propriety condition from the search propriety condition holder 801 by using the area decision code, and the second address generator 105 generates addresses of pixel data outputted from the first storage unit 103 on the basis of the search propriety condition. Therefore, the second address generator 105 can precisely generate pixel addresses of an area on which effective search is possible, leading to high-speed processing without unnecessary search.

[Embodiment 9]

Hereinafter, a motion vector detection apparatus according to a ninth embodiment of the present invention will be described with reference to FIG. 27.

Figure 27:
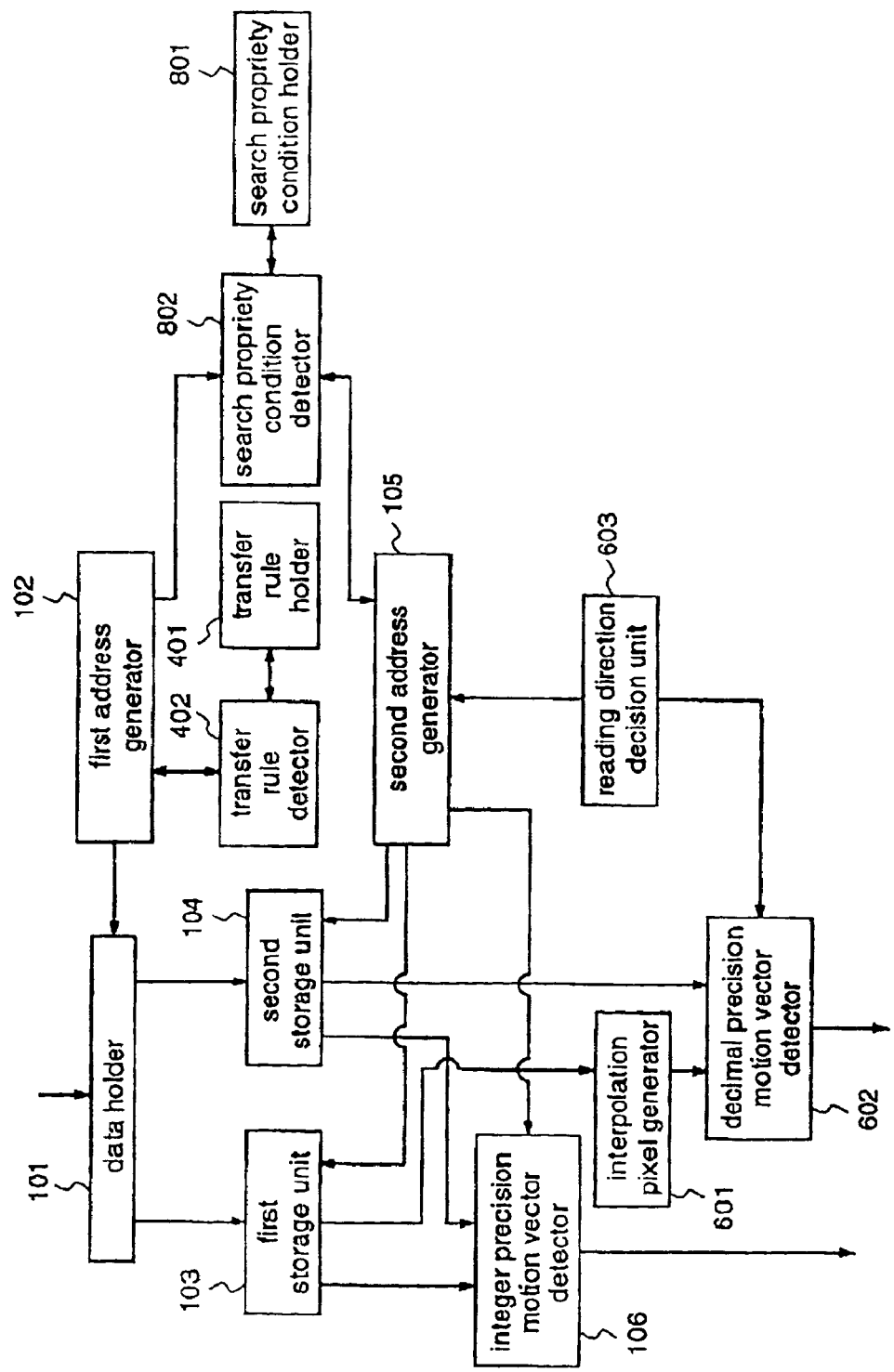
FIG. 27 is a block diagram illustrating a motion vector detection apparatus according to a ninth embodiment of the invention.

FIG. 27 is a block diagram illustrating the structure of a motion vector detection apparatus according to the ninth embodiment. With reference to FIG. 27, the motion vector detection apparatus comprises a data holder 101, a first address generator 102, a first storage unit 103, a second storage unit 104, a second address generator 105, an integer precision motion vector detector 106, a transfer rule holder 401, a transfer rule detector 402, an interpolation pixel generator 601, a decimal precision motion vector detector 602, a reading direction decision unit 603, a search propriety condition holder 801, and a search propriety condition detector 802.

The motion vector detection apparatus according to the ninth embodiment uses, when detecting a decimal precision motion vector, the search propriety condition holder 801 and the search propriety condition detector 802 which are used for detecting an integer precision motion vector as described for the eighth embodiment. The search propriety condition detector 802 detects search propriety conditions when detecting an integer precision motion vector and a decimal precision motion vector, respectively, and the second address generator 105 generate pixel addresses using the search propriety conditions detected by the detector 802. Since the respective constituents according to this ninth embodiment are identical to those already described for the sixth and eighth embodiments, repeated description is not necessary.

Since the search propriety condition holder 801 and the search propriety condition detector 802 used for detecting an integer precision motion vector are also used for detecting a decimal precision motion vector, the circuit scale is reduced, leading to reduced production cost.

[Embodiment 10]

Hereinafter, a motion vector detection apparatus according to a tenth embodiment of the present invention will be described with reference to FIG. 28.

Figure 28:
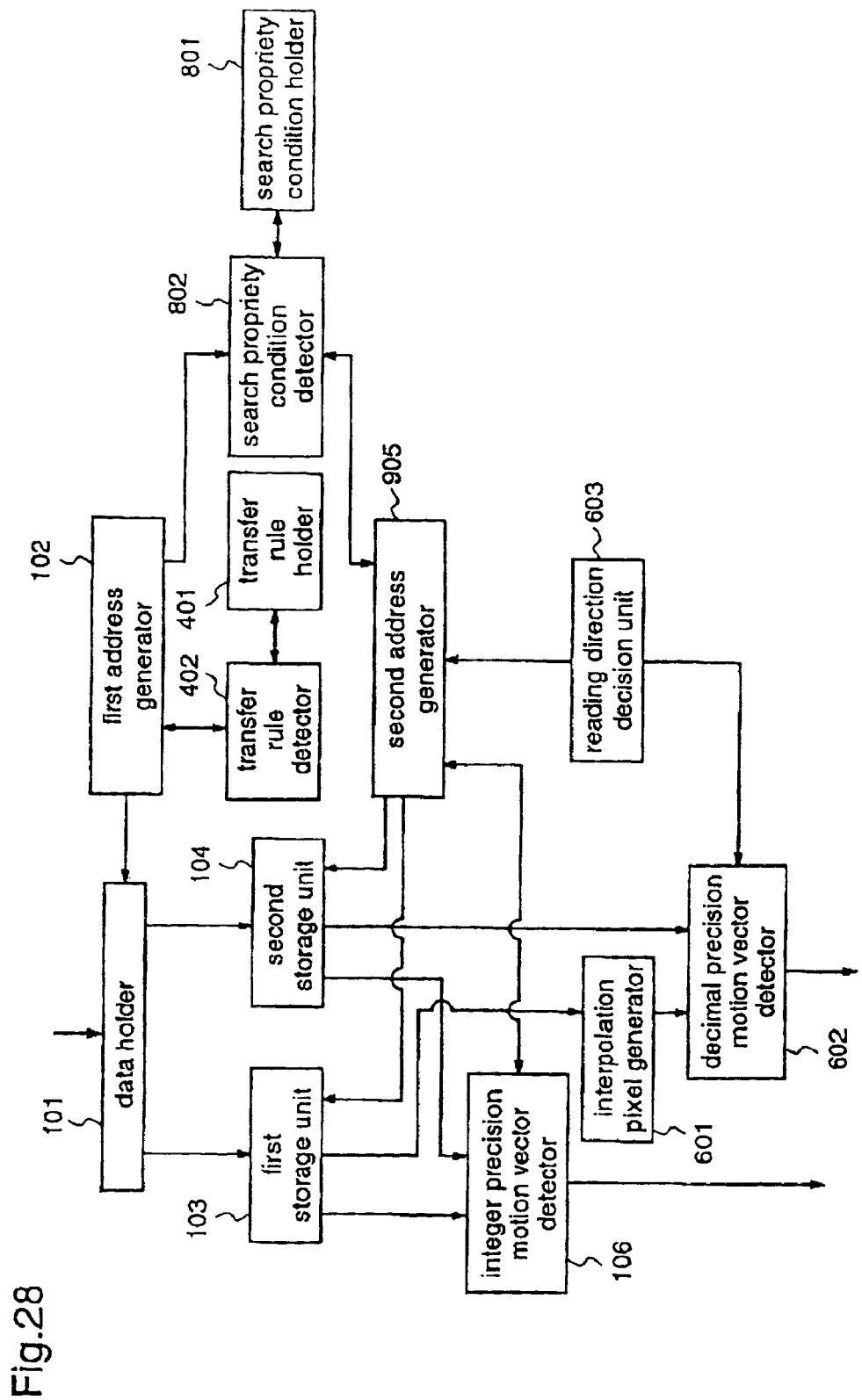
FIG. 28 is a block diagram illustrating a motion vector detection apparatus according to a tenth embodiment of the invention.

FIG. 28 is a block diagram illustrating the structure of a motion vector detection apparatus according to the tenth embodiment. With reference to FIG. 28, the motion vector detection apparatus comprises a data holder 101, a first address generator 102, a first storage unit 103, a second storage unit 104, a second address generator 905, an integer precision motion vector detector 106, a transfer rule holder 401, a transfer rule detector 402, an interpolation pixel generator 601, a decimal precision motion vector detector 602, a reading direction decision unit 603, a search propriety condition holder 801, and a search propriety condition detector 802.

The motion vector detection apparatus according to this tenth embodiment performs search for an integer precision motion vector by using a search propriety condition detected by the search propriety condition detector 802 to detect the integer precision motion vector. Thereafter, the motion vector detection apparatus performs search for a decimal precision motion vector by using the result of search (i.e., the search propriety) for detecting the integer precision motion vector. Since the respective constituents of the motion vector detection apparatus according to the tenth embodiment are identical to those already described for the sixth and eighth embodiment, repeated description is not necessary.

The second address generator 905 generates addresses of pixel data to be used for detection of an integer precision motion vector on the basis of the search propriety condition detected by the search propriety condition detector 802, and holds, for each reference block position, search propriety data indicating whether search could be performed on the corresponding reference block or not when detecting the integer precision motion vector. Further, when detection of a decimal precision motion vector is performed after detection of the integer precision motion vector, whether search can be Performed on the corresponding reference block or not is judged by using the search propriety data.

Hereinafter, the operation of the motion vector detection apparatus according to the tenth embodiment will be described with reference to FIG. 29.

Figure 29:
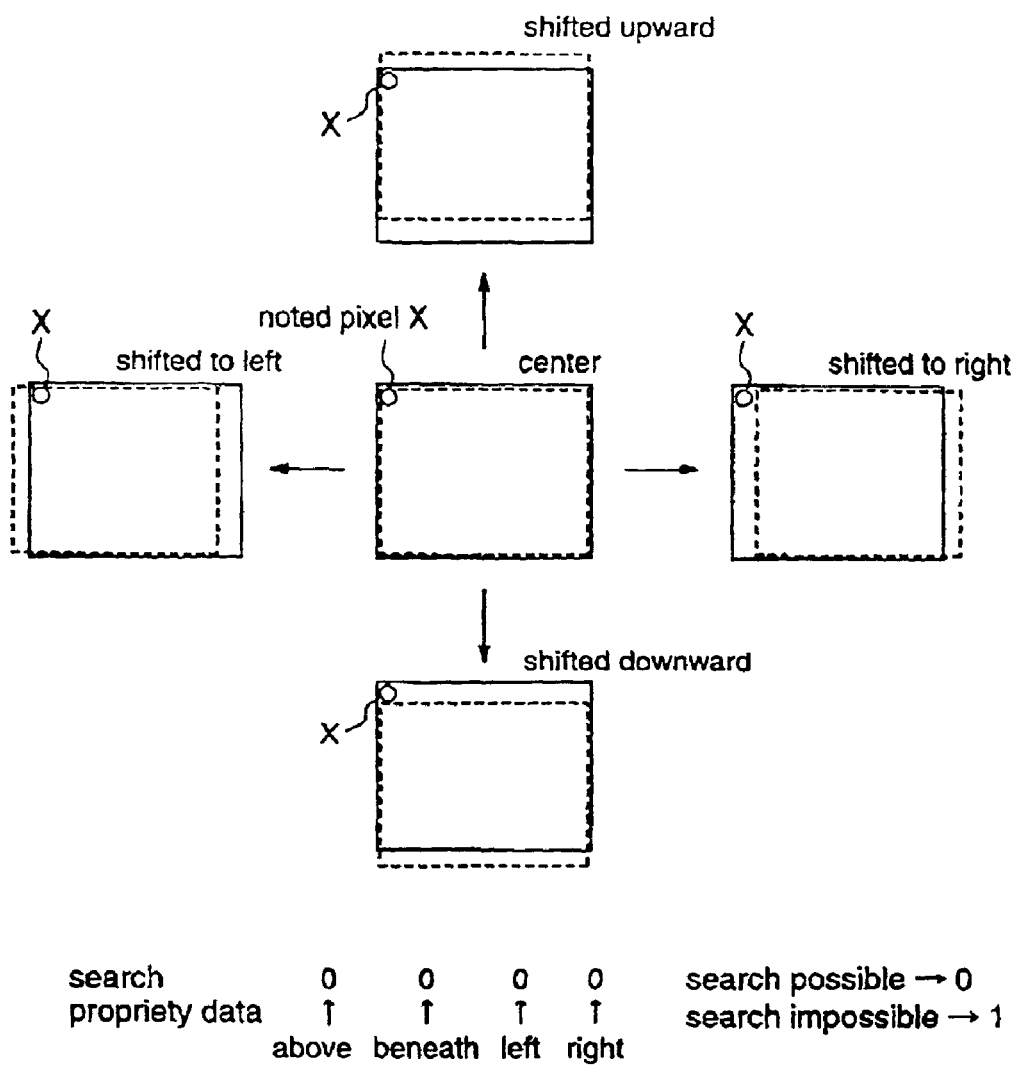
FIG. 29 is a diagram illustrating an example of motion vector search to detect an integer precision motion vector.

FIG. 29 is a diagram for explaining an example of motion vector search when detecting an integer precision motion vector, illustrating the positions of reference blocks (shown by the dotted line in FIG. 29) that are one pixel shifted upward, downward, to left, and to right, from a reference block at a specific position (block positioned in the center). Among the reference blocks having the positional relationship as shown in FIG. 29, when the reference block positioned in the center has the smallest sum of absolute differences, the position of this reference block is regarded as the target position for detection of an integer precision motion vector.

When performing detection of an integer precision motion vector, the second address generator 905 holds, as search propriety data comprising 4 bits, the search proprieties of the reference blocks positioned above, beneath, on the left, and on the right with respect to the target position. To be specific, as shown in FIG. 29, the four bits indicate, from the left-end bit, "above", "beneath", "left", and "right", and "1" is assigned to the bit indicating the reference block position in which searching could not be performed while "0" is assigned to the bit indicating the reference block position in which search could he performed.

In this way, even when performing, after detection of an integer precision motion vector, search for a decimal precision motion vector within the range of area where search was carried out to detect the integer precision motion vector, the second address generator 905 can generate addresses of pixel data outputted from the first storage unit 103 on the basis of the search propriety data comprising four bits. Thereby, it is possible to judge whether search can be performed or not, without detecting the search propriety condition when performing detection of the decimal precision motion vector, resulting in increased processing speed. Further, since the search result at detection of the integer precision motion vector is used for detection of the decimal precision motion vector, the circuit scale of reduced, leading to reduced production cost.

[Embodiment 11]

Hereinafter, a motion vector detection apparatus according to an eleventh embodiment of the present invention will be described with reference to FIG. 30.

Figure 30:
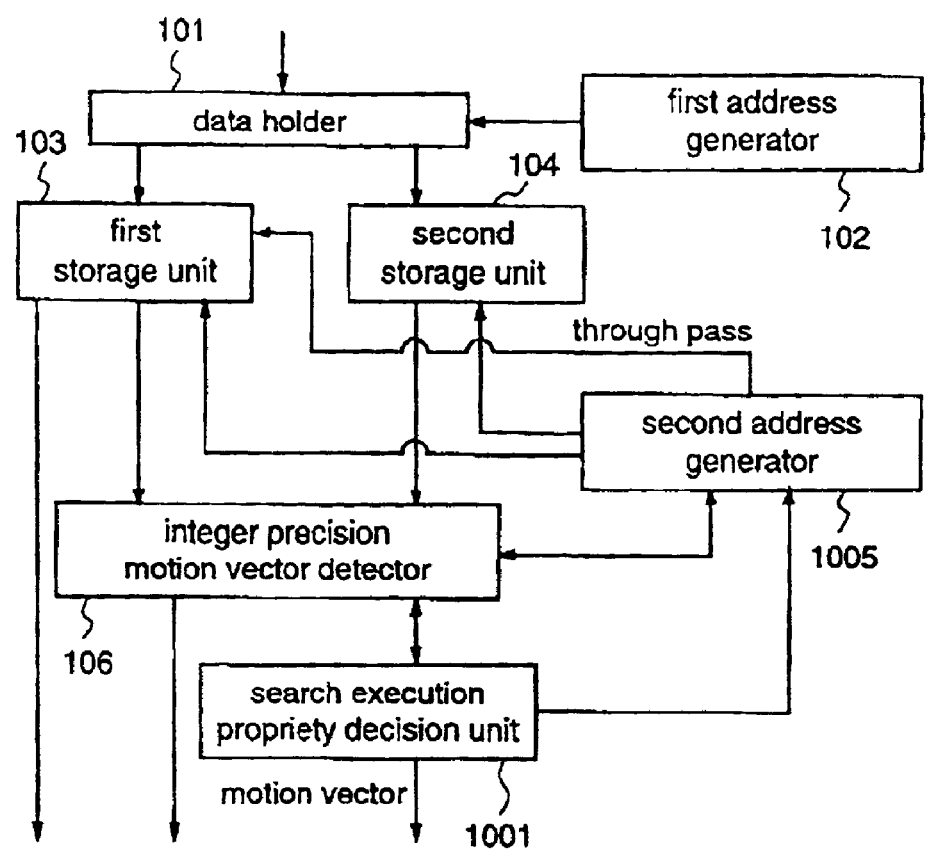
FIG. 30 is a block diagram illustrating a motion vector detection apparatus according to an eleventh embodiment of the invention.
Figure 31:
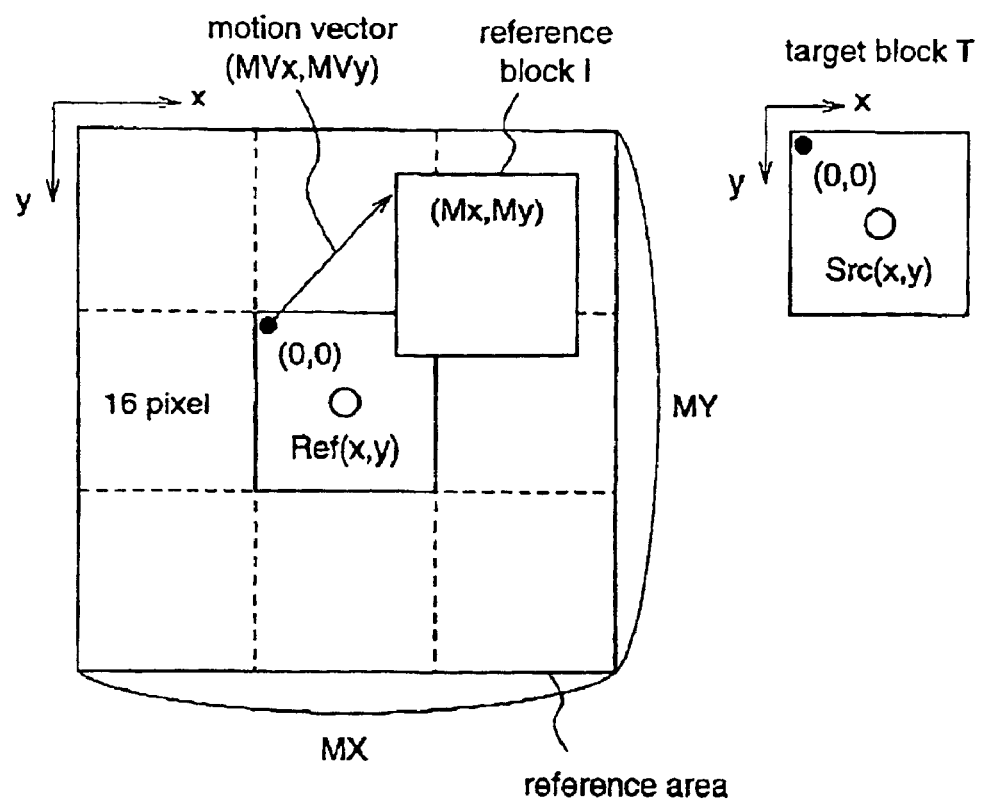
FIG. 31 is a diagram for explaining the conventional process of detecting a motion vector.

FIG. 30 is a block diagram illustrating the structure of a motion vector detection apparatus according to the eleventh embodiment. With reference to FIG. 30, the motion vector detection apparatus comprises a data holder 101, a first address generator 102, a first storage unit 103, a second storage unit 104, a second address generator 1005, an integer precision motion vector detector 106, and a search execution propriety decision unit 1001. The same constituents of the motion vector detection apparatus as those described for the first embodiment are given the same reference numerals, and description thereof will be omitted.

The search execution propriety decision unit 1001 holds a motion vector detected by the previous motion vector detection, and decides whether search should be executed or not by comparing the sum of absolute differences calculated by the integer precision motion vector detector 106 with a predetermined threshold value.

The second address generator 1005 generates addresses of data outputted from the first and second storage units 103 and 104, and generates a through pass for outputting the pixel data at the motion vector detection position, from the first storage unit 103 to the outside, bypassing the integer precision motion vector detector 106.

Next, the operation of the motion vector detection apparatus according to the eleventh embodiment will be described.

The second address generator 1005 generates addresses of pixel data outputted from the first storage unit 103 and the second storage unit 104, by using the motion vector that has been detected by the previous search and stored in the search execution propriety decision unit 1001.

Since, generally, a detected motion vector hardly changes in the vicinity of a target block on which search to detect the motion vector is carried out, the second address generator 1005 initially generates addresses of pixel data so as to perform block matching on a reference block in a position where the possibility of detecting a motion vector is high (e.g., the same position as the block on which a motion vector has just detected).

The integer precision motion vector detector 106 receives the pixel data of the reference block read from the first storage unit 103 and the pixel data of the target block read from the second storage unit 104, and calculates the sun of absolute differences in pixel values between the target block and the reference block, and outputs the result to the search execution propriety decision unit 1001.

The search execution propriety decision unit 1001 checks whether the sum of absolute differences calculated by the integer precision motion vector detector 106 is smaller than a predetermined threshold value or not. When it is smaller than the threshold value, the decision unit 1001 decides that the position of the reference block, which is obtained by the second address generator 1005 using the motion vector that has been detected in the previous search, is the motion vector detection position, and ends the motion vector search.

On the other hand, when the sum of absolute differences is larger than the threshold value, the decision unit 1001 instructs the second address generator 1005 to execute motion vector search on another reference block.

In this way, block matching is performed on the reference block in the position where the possibility of detecting a motion vector is high (e.g., the same position as the block from which a motion vector has just detected). Then, based on the result of the matching (sum of absolute differences), whether subsequent search should be performed or not is decided. Therefore, high-speed processing and low power consumption are achieved.

Further, when it is decided that further motion vector search is not carried out, pixel data indicated by the motion vector that has been detected in the previous search are required, as pixel data to be used after motion vector search, amongst the pixel data of the reference blocks stored in the first storage unit 103.

Therefore, in this eleventh embodiment, the search execution propriety decision unit 1001 instructs the second address generator 1005 to generate a through pass for outputting the pixel data at the motion vector position detected by the previous search, bypassing the integer precision motion vector detector 106, to the outside. Then, the second address generator 1005 supplies the through pass to the first storage unit 103, whereby the pixel data of the reference block stored in the first storage unit 103 is outputted to an external device, bypassing the integer precision motion vector detector 106.

In this way, even when using the motion vector that has been detected in the previous motion vector search, since the second address generator 1005 supplies the first storage unit 103 with the through pass, the first storage unit 103 can output the pixel data indicated by the motion vector position that has been detected in the previous search, to the external device, for the process after the motion vector search.

While in this eleventh embodiment the motion vector detection apparatus has, as means to detect a motion vector, only the integer precision motion vector detector 106 for detecting an integer precision motion vector, the present invention is not restricted thereto. The motion vector detection apparatus may have an interpolation pixel generator for generating decimal precision pixel data, and a decimal precision motion vector detector for detecting a decimal precision motion vector from the data outputted from the interpolation pixel generator and the data outputted from the second storage unit.

[Embodiment 12]

A motion vector detection apparatus according to a twelfth embodiment of the present invention is obtained by combining at least two of the above-mentioned first to eleventh embodiments. Also in this case, the same effects as described for the first to eleventh embodiment are achieved.

What is claimed is:

1. A motion vector detection apparatus for detecting a motion vector by performing block matching between a target block comprising a plurality of pixels in a current image, and a reference block comprising a plurality of pixels in a predetermined reference area in a past image that is previous to the current image, said apparatus comprising:
    a first address generator for generating addresses of data in the target block and addresses of data in the reference area;
    a first storage unit for holding data of the reference area designated by the first address generator;
    a second storage unit for holding data of the target block designated by the first address generator;
    a second address generator for generating addresses of data to be outputted from the first storage unit and the second storage unit; and
    a motion vector detector for detecting a motion vector by using the data outputted from the first storage unit and the data outputted from the second storage unit;
    wherein said second address generator is for performing subsampling on the addresses of the data to be outputted from the first storage unit and the second storage unit so that the addresses are sampled in a checker pattern with respect to pixel arrays corresponding to images of the reference block and the target block,
    wherein said second address generator comprises:
        a row counter for counting pixel addresses in a horizontal direction,
        a column counter for counting pixel addresses in a vertical direction, and
        an address holder for holding addresses of pixel data; and
    is for adding an inverted value of LSB (least significant bit) of a count value outputted from the column counter to each address of pixel data, for performing checker-pattern subsampling with respect to the pixel arrays corresponding to the images of the reference block and the target block.

2. A motion vector detection apparatus as defined in claim 1, wherein said motion vector detector is an integer precision motion vector detector that detects an integer precision motion vector from the data outputted from the first storage unit and the data outputted from the second storage unit.

3. A motion vector detection apparatus as defined in claim 1, wherein said motion vector detector comprises:
    an interpolation pixel generator for receiving the data outputted from the first storage unit, and generating decimal precision pixel data; and
    a decimal precision motion vector detector for detecting a decimal precision motion vector from the data outputted from the interpolation pixel generator and the data outputted from the second storage unit.

4. A motion vector detection apparatus as defined in claim 1, wherein said motion vector detector comprises:
    an integer precision motion vector detector that detects an integer precision motion vector from the data outputted from the first storage unit and the data outputted from the second storage unit;
    an interpolation pixel generator for receiving the data outputted from the first storage unit, and generating decimal precision pixel data; and
    a decimal precision motion vector detector for detecting a decimal precision motion vector from the data outputted from the interpolation pixel generator and the data outputted from the second storage unit.

5. A motion vector detection method for detecting a motion vector by performing block matching between a target block comprising a plurality of pixels in a current image, and a reference block comprising a plurality of pixels in a predetermined reference area in a past image that is previous to the current image, said method comprising:
    a first address generation step of generating addresses of data in the target block and addresses of data in the reference area;
    a first storage step of holding data of the reference area designated by the first address generation step;
    a second storage step of holding data of the target block designated by the first address generation step;
    a second address generation step of generating addresses of pixel data to be outputted from stored reference area data and target block data; and
    a motion vector detection step of detecting a motion vector by using the reference area data and the target block data;
    wherein said second address generation step performs subsampling on the addresses of the data to be outputted from the first storage unit and the second storage unit so that the addresses are sampled in a checker pattern with respect to pixel arrays corresponding to images of the reference block and the target
    wherein said second address generation step comprises:
        a first counting step of counting pixel addresses in a horizontal direction,
        a second counting step of counting pixel addresses in a vertical direction, and
        an address holding step of holding addresses of pixel data; and
    is for adding an inverted value of LSB (least significant bit) of a count value in the second counting step to each address of pixel data, for performing checker-pattern subsampling with respect to the pixel arrays corresponding to the images of the reference block and the target block.

6. A motion vector detection method as defined in claim 5, wherein said motion vector detection step is an integer precision motion vector detection step of detecting an integer precision motion vector by using the reference area data and the target block data.

7. A motion vector detection method as defined in claim 5, wherein said motion vector detection step comprises:
    an interpolation pixel generation step of receiving the pixel data constituting the reference area data, and generating decimal precision pixel data; and
    a decimal precision motion vector detection step of detecting a decimal precision motion vector, using the data outputted from the interpolation pixel generation step, and the target block data.

8. A motion vector detection method as defined in claim 5, wherein said motion vector detection step comprises:
    an integer precision motion vector detection step of detecting an integer precision motion vector, using the reference area data and the target block data;
    an interpolation pixel generation step of receiving the pixel data constituting the reference area data, and generating decimal precision pixel data; and
    a decimal precision motion vector detection step of detecting a decimal precision motion vector, using the data outputted from the interpolation pixel generation step, and the target block data.

* * * * *